(12) United States Patent
Shaffer et al.

(10) Patent No.: US 9,306,620 B2
(45) Date of Patent: Apr. 5, 2016

(54) DYNAMIC ASSIGNMENT OF FREQUENCY HOPPING SEQUENCES IN A COMMUNICATION NETWORK

(71) Applicant: Cisco Technology, Inc., San Jose, CA (US)

(72) Inventors: Shmuel Shaffer, Palo Alto, CA (US); Sandeep J. Shetty, San Jose, CA (US); Charles Okwudiafor, Fremont, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/296,728

(22) Filed: Jun. 5, 2014

(65) Prior Publication Data
US 2014/0286377 A1 Sep. 25, 2014

Related U.S. Application Data

(62) Division of application No. 12/971,284, filed on Dec. 17, 2010, now Pat. No. 8,780,953.

(51) Int. Cl.
*H04B 1/713* (2011.01)
*H04B 1/7143* (2011.01)

(52) U.S. Cl.
CPC .............. *H04B 1/713* (2013.01); *H04B 1/7143* (2013.01)

(58) Field of Classification Search
CPC ........ H04B 1/69; H04B 1/713; H04B 1/7136; H04B 1/71362; H04B 1/71365; H04B 1/7154; H04B 2001/6904; H04B 2201/713; H04B 2201/71307
USPC .......... 375/130, 132, 133, 134, 135, 146, 295
See application file for complete search history.

(56) References Cited

U.S. PATENT DOCUMENTS

| 5,781,536 A | 7/1998 | Ahmadi et al. |
| 5,852,630 A * | 12/1998 | Langberg et al. ............. 375/219 |

(Continued)

OTHER PUBLICATIONS

Thubert, et al., "RPL Objective Function 0", Internet Draft, draft-ietf-roll-of0-03, Jul. 2010, 9 pages, The Internet Engineering Task Force Trust.

(Continued)

*Primary Examiner* — Siu Lee
(74) *Attorney, Agent, or Firm* — Parker Ibrahim & Berg LLC; James M. Behrukc; Stephen D. LeBarron

(57) ABSTRACT

In one embodiment, a management device determines a topology of nodes in a network. Based on the topology, frequency hopping sequences are assigned (and notified) to the nodes such that each particular node of a certain set of the nodes is assigned a frequency hopping sequence on which to transmit that is different than frequency hopping sequences of neighbors and hidden neighbors of that particular node. In another embodiment, a transmitting node first transmits a transmission indication signal on its particular frequency band based on its frequency hopping sequence, and then transmits a message on the particular frequency band. In a further embodiment, a receiving node listening to a plurality of frequency bands may detect the transmission indication signal on the particular frequency band. In response, the receiving node filters out all frequency bands other than the particular frequency band, and receives the following transmission on that particular frequency band.

8 Claims, 22 Drawing Sheets

(56) References Cited

U.S. PATENT DOCUMENTS

| | | | |
|---|---|---|---|
| 6,389,010 B1* | 5/2002 | Kubler et al. | 370/353 |
| 6,829,336 B1 | 12/2004 | Issaa et al. | |
| 7,408,907 B2 | 8/2008 | Diener | |
| 7,424,268 B2 | 9/2008 | Diener et al. | |
| 7,444,145 B2 | 10/2008 | Diener | |
| 7,486,639 B2 | 2/2009 | Stanwood et al. | |
| 7,634,536 B2 | 12/2009 | Halasz | |
| 7,656,936 B2 | 2/2010 | Li et al. | |
| 7,756,542 B1 | 7/2010 | Kaiser et al. | |
| 7,826,560 B2 | 11/2010 | Raleigh et al. | |
| 8,891,586 B1* | 11/2014 | Nichols | 375/132 |
| 2002/0085622 A1 | 7/2002 | Dhar et al. | |
| 2004/0125753 A1* | 7/2004 | Mahany et al. | 370/254 |
| 2006/0072602 A1 | 4/2006 | Achanta | |
| 2006/0133332 A1 | 6/2006 | Achanta | |
| 2009/0201851 A1 | 8/2009 | Kruys et al. | |
| 2010/0226342 A1* | 9/2010 | Colling et al. | 370/336 |

OTHER PUBLICATIONS

Vasseur, et al., "Routing Metrics Used for Path Calculation in Low Power and Lossy Networks", Network Working Group, Internet Draft, draft-ietf-roll-routing-metrics-12, Nov. 2010, 30 pages, The Internet Engineering Task Force Trust.

Winter, et al., "RPL: IPv6 Routing Protocol for Low Power and Lossy Networks", Internet Draft, draft-ietf-roll-rpl-15, Nov. 2010, 144 pages, The Internet Engineering Task Force Trust.

* cited by examiner

| RANKING (or VALUE) 805 | NODE ID 810 | ASSIGNED FREQUENCY HOPPING SEQUENCE 730 | |
|---|---|---|---|
| - | - | - | ⎫ |
| - | - | - | ⎬ ENTRIES 850 |
| - | - | - | ⎭ |

TABLE/LIST 800

FIG. 8

DYNAMIC ASSIGNMENT OF FREQUENCY HOPPING SEQUENCES IN A COMMUNICATION NETWORK

RELATED APPLICATION

This application is a divisional of U.S. patent application Ser. No. 12/971,284, entitled DYNAMIC ASSIGNMENT OF FREQUENCY HIPPING SEQUENCES IN A COMMUNICATION NETWORK, filed Dec 17, 2010, by Shaffer et al., the contents of which are hereby incorporated by reference.

TECHNICAL FIELD

The present disclosure relates generally to communication networks, and, more particularly, to congestion management in shared media communication networks (e.g., wireless networks).

BACKGROUND

One of the major issues in many Low power and Lossy Networks (LLNs) is link congestion: not only is the bandwidth very limited, but it is well-known that the efficiency of data transmission greatly degrades (e.g., collapses) once the offered load exceeds some known limit. For instance, in shared media networks, such as wireless networks, the higher the traffic through a specific link, the higher is the probability of packet collisions (over that link). As the number of collisions on a specific link increases its effective bandwidth diminishes. Additionally, packet collisions may necessitate is packet re-transmission which artificially increases the number of packets the network attempts to transmit over the specific link. The fact that the network attempts to transmit more packets into a diminishing bandwidth may cause a collapse/degradation in network performance over this specific link.

Generally, not all locations in a network suffer from the same congestion problems and often not at the same time. That is, there may be certain locations (nodes/links) referred to as "choke points" within the network where most of the congestion (contention, collisions, interference) occurs. For example, in directed acyclic graphs (DAGs), which are frequently point-to-multipoint (P2MP) or multipoint-to-point (MP2P), choke points may frequently occur at or near a "root" node of the DAG, as well at other locations within the DAG depending upon the specific topology of the DAG.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example table/list.

DESCRIPTION OF EXAMPLE EMBODIMENTS

Overview

Figure 1:
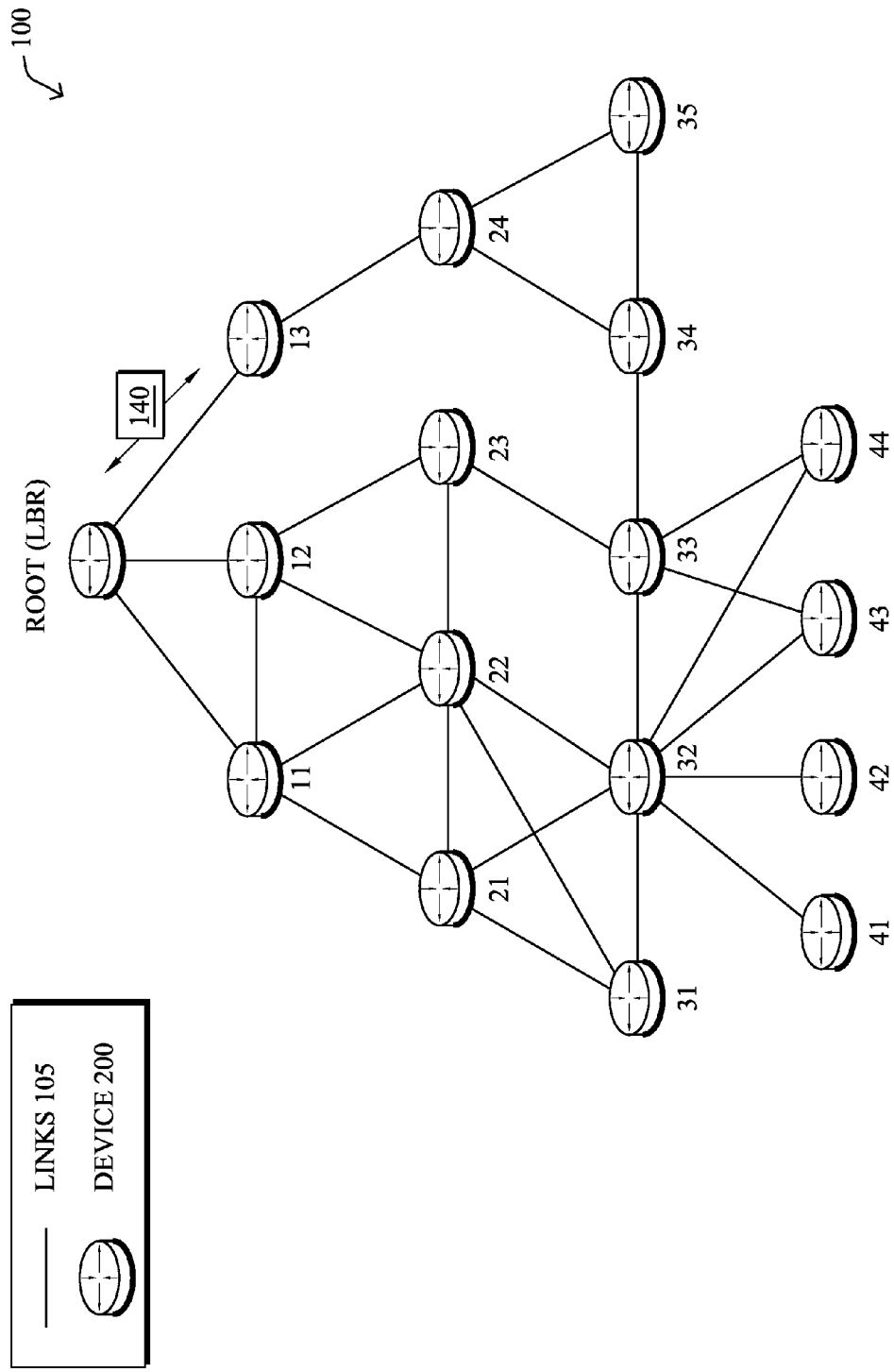
FIG. 1 illustrates an example computer network.

According to one or more embodiments of the disclosure, a management device determines a topology of nodes in a network. Based on the topology, frequency hopping sequences are assigned (and notified) to the nodes such that each particular node of a certain set of the nodes is assigned a frequency hopping sequence on which to transmit that is different (at least at any point in time) than frequency hopping sequences of neighbors and hidden neighbors of that particular node. Receivers are adapted to listen for transmissions on all frequency bands.

According to one or more additional embodiments of the disclosure, a transmitting node determines that it has a message to transmit within the network, and identifies a particular frequency band on which the node is to transmit based on its assigned frequency hopping sequences (that is different than frequency hopping sequences of neighbors and hidden neighbors of the node). The transmitting node first transmits a transmission indication signal on the particular frequency band and then transmits the message on the same particular frequency band.

According to one or more additional embodiments of the disclosure, a receiving node listens to a plurality of frequency bands within a network, and may detect a transmission indication signal on a particular frequency band. In response, the node filters out all frequency bands other than the particular frequency band, and can receive a transmission following the signal on the particular frequency band, accordingly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others.

A wireless network, in particular, is a type of shred media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of nodes (e.g., wireless) in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example computer network 100 illustratively comprising nodes/devices 200 (e.g., labeled as shown, "Root," "11," "12," . . . "43," "44") interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes. Further, while the embodiments are shown herein with reference to a generally wireless network, the description herein is not so limited, and may be applied to networks that have wired and wireless links.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media is protocols where appropriate. As described herein, the communication may be based on a frequency hopping protocol. In this context, a protocol consists of a set of rules defining how the nodes interact with each other.

Figure 2:
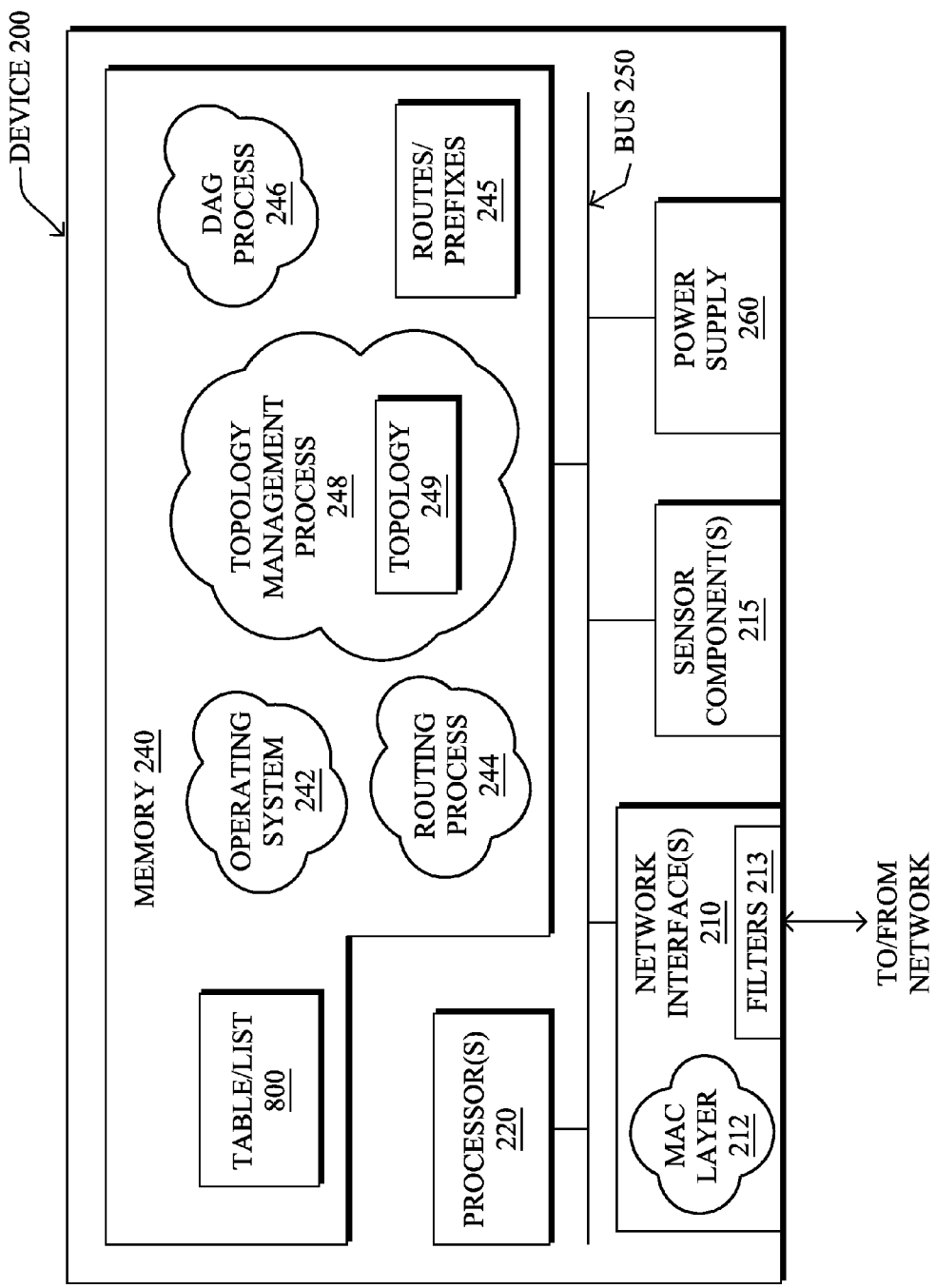
FIG. 2 illustrates an example network device/node.

FIG. 2 is a schematic block diagram of an example node/device 200 that may be used with one or more embodiments described herein, e.g., as nodes 11-44 and ROOT. The device may comprise one or more network interfaces 210 (e.g., wireless), an optional sensor component (e.g., for sensor network devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly). The network interfaces may be configured to transmit and/or receive data using a variety of different communication protocols, particularly wireless protocols as noted above and as will be understood by those skilled in the art. In addition, the interfaces 210 may comprise an illustrative media access control (MAC) layer module 212 (and other layers, such as the physical or "PHY" layer, as will be understood by those skilled in the art) and one or more filters 213. Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. Also, one or more tables/lists 800, as described below, may be stored in memory 240 of certain devices (e.g., management devices).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the is less capable devices exactly where to send the packets, and the less capable devices simply forward the packets as directed.

Figure 3:
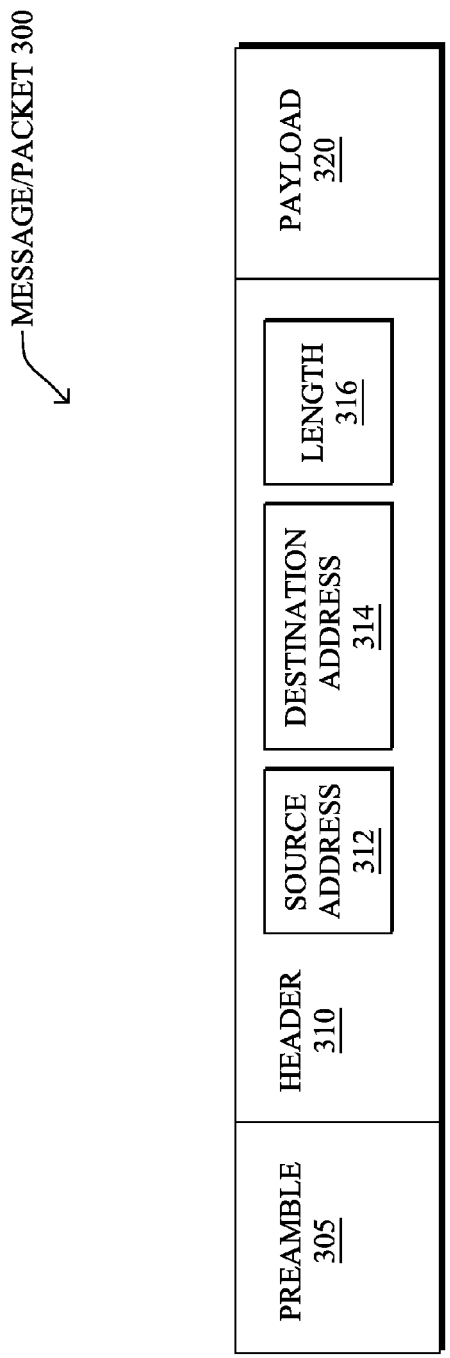
FIG. 3 illustrates an example message.

FIG. 3 illustrates an example simplified message/packet format (transmission 300) that may be used to communicate information between devices 200 in the network. For example, message 300 may illustratively comprise a header 310 with one or more fields such as a source address 312, a destination address 314, and a length field 316, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly. Note that while the transmission 300 in FIG. 3 illustrates a packetized transmission, non-packetized transmissions may also be used with the techniques herein, accordingly.

As mentioned above, Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several is thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such is as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietfroll-routing-metrics-12> by Vasseur, et al. (Nov. 10, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 4:
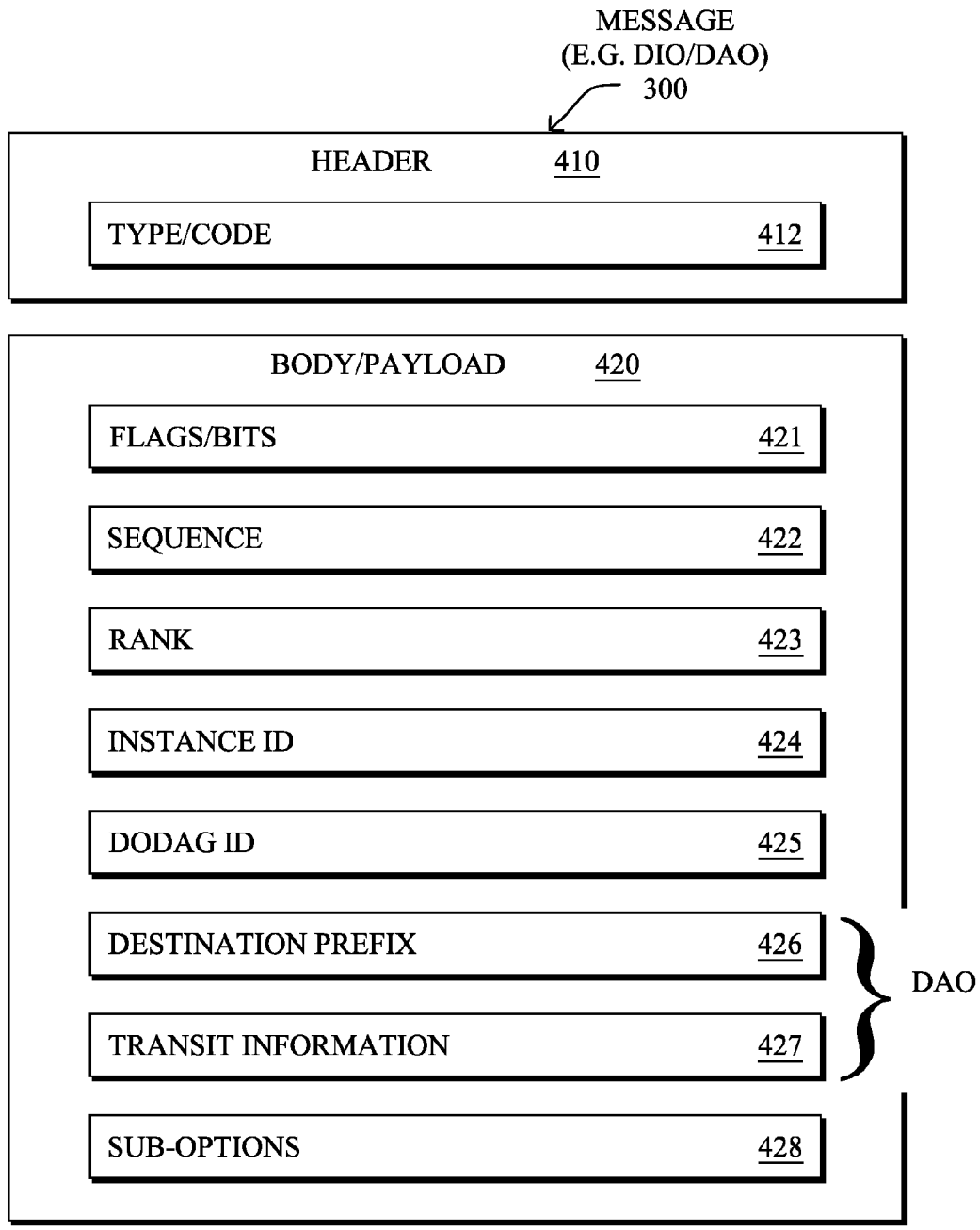
FIG. 4 illustrates an example topology management message.

FIG. 4 illustrates an example simplified control message format 400 that may be used for discovery and route dissemination when building a DAG, e.g., as a DIO or DAO. Message 400 illustratively comprises a header 410 with one or more fields 412 that identify the type of message (e.g., a RPL control message), and a specific code indicating the specific type of message, e.g., a DIO or a DAO (or a DAG Information Solicitation). Within the body/payload 420 of the message may be a plurality of fields used to relay the pertinent information. In particular, the fields may comprise various flags/ bits 421, a sequence number 422, a rank value 423, an instance ID 424, a DODAG ID 425, and other fields, each as may be appreciated in more detail by those skilled in the art. Further, for DAO messages, additional fields for destination prefixes 426 and a transit information field 427 may also be included, among others (e.g., DAO_Sequence used for ACKs, etc.). For either DIOs or DAOs, one or more additional sub-option fields 428 may be used to supply additional or custom information within the message 400. For instance, an objective code point (OCP) sub-option field may be used within a DIO to carry codes specifying a particular objective function (OF) to be used for building the associated DAG. Alternatively, sub-option fields 428 may be used to carry other certain information within a message 400, such as indications, requests, capabilities, lists, etc., as may be described herein, e.g., in one or more type-length-value (TLV) fields.

Figure 5:
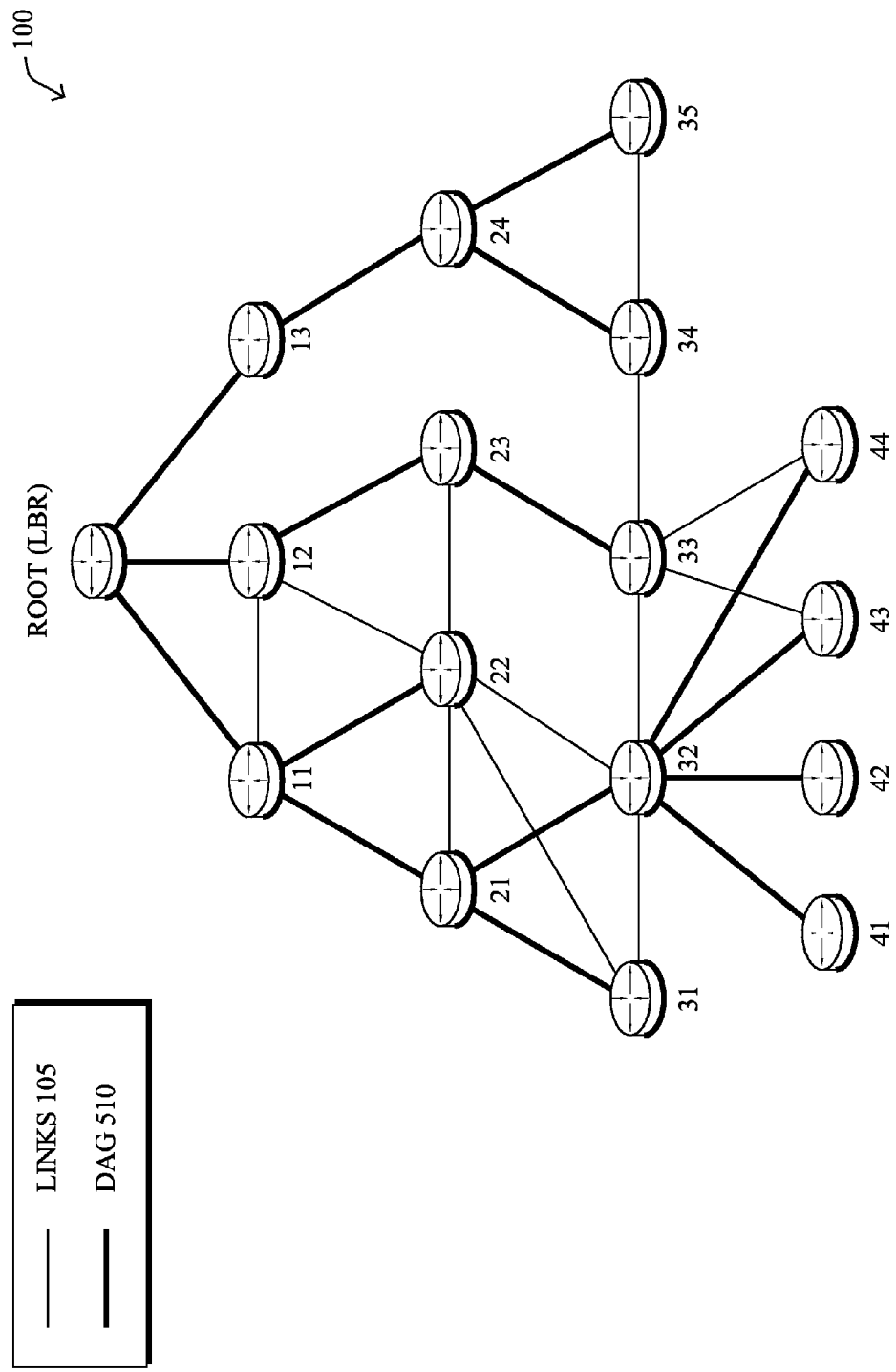
FIG. 5 illustrates an example directed acyclic graph (DAG) in the computer network of FIG. 1.

FIG. 5 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 510 (shown as bolded lines), which extends from the root node toward one or more leaf nodes (nodes without children). Traffic/packets 140 (shown in FIG. 1) may then traverse the DAG 510 in either the upward direction toward the root or downward toward the leaf nodes.

As noted above, one of the issues in many LLNs is link congestion. Congestion may occur in a number of circumstances, for example, in response to a burst of critical messages after power failure in the grid, the failure of a node or a set of links causing a DAG topology change with a large number of new children joining a node, etc., or even simply in response generally to there being too much traffic in the network. Generally, not all locations in a network suffer from the same congestion problems and often locations do not suffer at the same time. That is, there may be certain locations (nodes/links) referred to as "choke points" within the network where most of the congestion (contention, collisions, interference) occurs.

For example, in directed acyclic graphs (DAGs), which are frequently point-to-multipoint (P2MP) or multipoint-to-point (MP2P), choke points may frequently occur at or near a "root" node of the DAG, as well at other locations within the DAG depending upon the specific topology of the DAG and traffic matrix. In particular, as described above, as the DAG is constructed, some nodes can communicate directly to the root ("first order children"), and select the root node as their parent node. Other nodes may be able to communicate to the root via the first order children ("second order children"), and they may select the first order children as their parent nodes, and the process continues until all the nodes in the network find a communication path towards the root. Assuming that all nodes generate and/or receive similar amount of information, the more children (of all orders) a node has the higher is the traffic traversing through it. At the limit, given the fact that all traffic generally passes through the root, it is obvious that the root node has the highest traffic in a given DAG.

In a fully symmetric network, because all traffic from children nodes of order i+1 traverses via children nodes of order i and because all nodes of the same order have a similar number of children, the closer to the root a node is, the higher the traffic the carries. Most real-life deployment scenarios, however, have network topologies are not symmetric, and as such the lower order nodes (higher in the DAG) may not be assumed to carry higher traffic.

Figure 6:
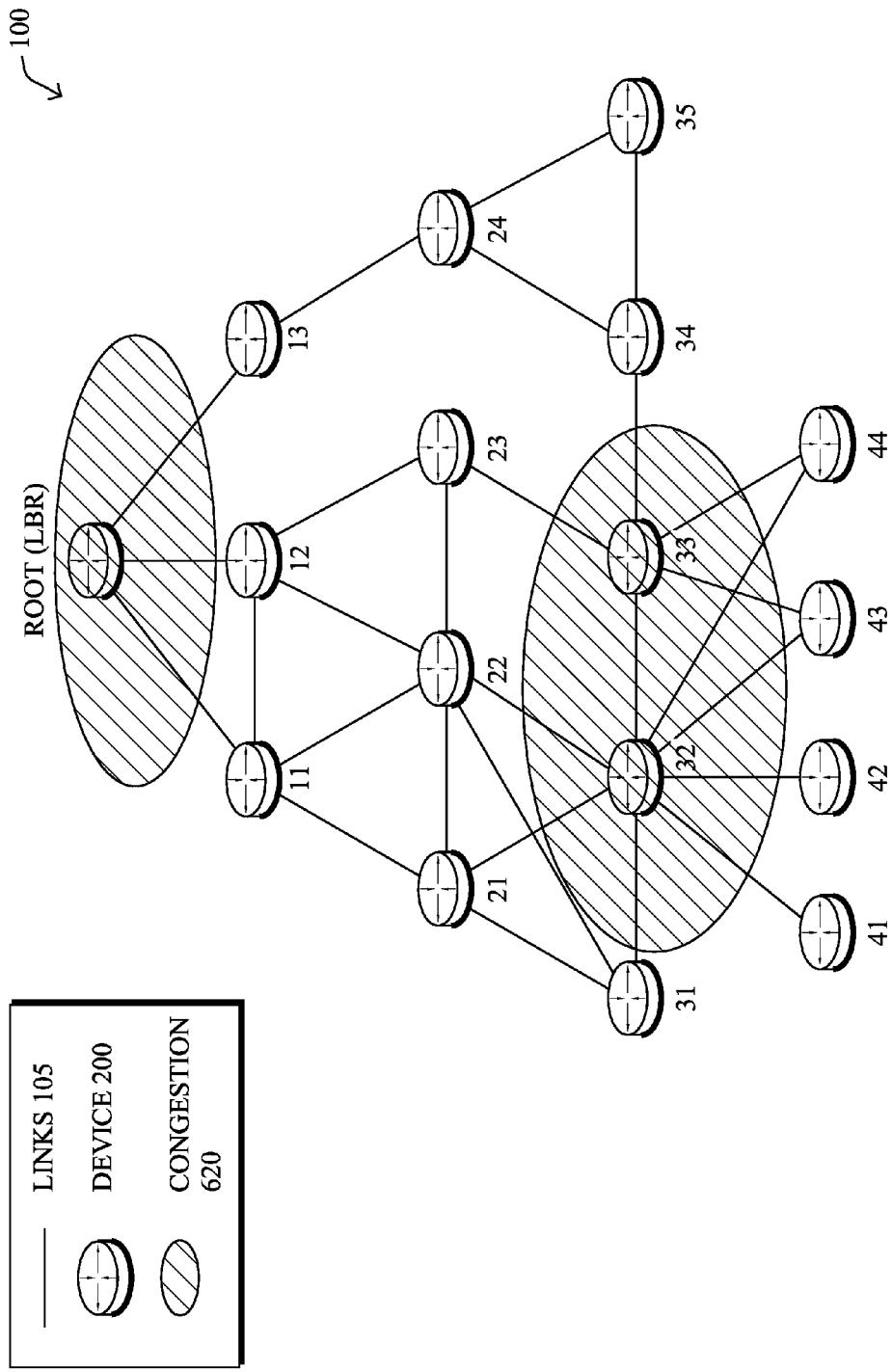
FIG. 6 illustrates an example of congestion in the network of FIG. 1.

FIG. 6 illustrates example locations of congestion (620) in the network of FIG. 1. For instance, due to a number of neighbors or the DAG shape, etc., the root node may generally be congested, and other nodes may be as well, such as nodes 32 and/or 33 with many neighbors (or, e.g., child nodes in the DAG) such as nodes 41-44, etc. For instance, if each of these neighbor nodes of node 32 is attempting to transmit at the same time, node 32's links may become overloaded with traffic, and node 32 may be unable to interpret the conflicting signals from its own child and/or parent nodes. Also, nodes 32 and 33, though possibly transmitting to different parent nodes, may still be located within listening range of each other, and thus may interfere with (e.g., collide, conflict, etc.) with the other node's reception of its own intended traffic. In this instance, once the congestion occurs, it may be exacerbated by the fact that the child and/or parent nodes, experiencing lost traffic, begin to retransmit their traffic for additional attempts, further increasing the amount of traffic at this particular congested location 620.

Current systems may be configured to operate according to a frequency hopping allocation that uses the same frequency hopping sequence for all nodes in the network other than for the first order children, where first order children hop on a different frequency sequence in order to alleviate collisions with second order children. This type of system results in a sub optimal solution for the following reasons: a) the network is generally asymmetric, and therefore one cannot infer that all first order children carry higher data flows than children of a higher order; b) the system fails to bring into account that many of the collisions experienced by first order children occur with packets to/from other first order children; and c) the system fails to address congestion at any other location within a network.

Dynamic Assignment of Frequency Hopping Sequences

The techniques herein may be used to alleviate congestion in the choke points of the network, thus minimizing collisions and the need for retransmissions. For instance, as described herein, different frequency hopping sequences may be dynamically assigned to individual nodes/links based on the traffic/congestion in the network, and as such, techniques are described regarding simultaneous listening on multiple channels at the same time. That is, while certain mesh networks may utilize a frequency hopping sequence that is shared by all nodes in the network (and needs to be synchronized), the techniques herein assign a different frequency hopping sequence to the nodes based on their traffic levels, and receivers listen to all frequencies used in the network for the transmissions.

Specifically, according to one or more embodiments of the disclosure as described in detail below, a management device determines a topology of shared media (e.g., wireless) nodes in a network. Based on the topology, frequency hopping sequences are assigned (and notified) to the nodes such that each particular node of a certain set of the nodes is assigned a frequency hopping sequence on which to transmit that is different, at any point in time (i.e., a particular frequency band), than frequency hopping sequences of neighbors and hidden neighbors of that particular node. In one or more embodiments, a transmitting node first transmits a transmission indication signal on its particular assigned frequency hopping sequence (a particular frequency band), and then transmits message according to the particular assigned frequency hopping sequences (i.e., the same particular frequency band). Further, in one or more embodiments, a receiving node listening to a plurality of frequency bands may detect the transmission indication signal on the particular frequency band. In response, the receiving node filters out all frequency bands other than the particular frequency band, and receives the following transmission (message) on that particular frequency band, accordingly.

Illustratively, the techniques described herein may be performed by hardware, software, and/or firmware. For instance, certain embodiments (e.g., management) may be performed in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Also, certain embodiments (e.g., transmission/reception) may be performed in accordance with MAC layer module 212, which may contain computer executable instructions executed by a processor (e.g., processor 220 or an independent processor within the network interface 210) to perform functions relating to the novel techniques described herein, such as, e.g., as part of a frequency selection/hopping communication protocol. For example, the techniques herein may be treated as extensions to conventional wireless communication protocols, such as the 802.11 protocol, WiFi, etc., and as such, would be processed by similar components understood in the art that execute such protocols, accordingly.

Frequency Assignment:

Operationally, in response to a certain trigger, a management node, such as a root node of a DAG 510, a head-end node, a network management application, etc., may determine a topology of nodes in a network 100. Illustratively, the topology may be determined based on routing protocols, neighbor tables (e.g., of established DAGs 510), etc. Further, triggers may comprise various reasons to perform the techniques herein, such as upon DAG establishment, an administrator request, detected congestion (e.g., a rate/number of lost packets, bandwidth utilization, etc.), periodic (e.g., every hour/day/week/etc.), and other reasons that will be appreciated by those skilled in the art.

The management node then assigns these nodes/links a dedicated frequency hopping sequence in a manner that greatly reduces collisions within the network. In particular, the management node may then assign frequency hopping sequences to the nodes based on the topology such that each particular node of a certain set of the nodes is assigned a frequency hopping sequence on which to transmit that is different than frequency hopping sequences of neighbors and hidden neighbors of that particular node. (Note that as described below, receivers are adapted to listen for transmissions on all frequency bands at once so any incoming reception from a transmitting device need not be on a pre-synchronized frequency band.)

As used herein, and as may be appreciated by those skilled in the art, "hidden neighbors" are nodes that share a neighbor but that are generally invisible to each other, thus their transmissions to the shared neighbor may conflict. For example, as shown in the network 100 of FIG. 1, nodes 11 and 13 are hidden neighbors of one another due to their shared neighbor at the root node. Nodes 11 and 12, however, are direct neighbors, in that they can see each other via a direct link, even though they, too, may send communication to the shared root node neighbor.

According to the techniques herein, the transmitting nodes in the network may be notified of their respective assigned frequency hopping sequence. Since the frequency hopping sequences are assigned based on the network topology, e.g., based on the traffic within the topology, transmissions over the network segments where most of the collisions would have occurred (choke points) may experience a reduction of collisions, thus greatly increasing the overall performance of the network. Notably, the transmitting nodes to which frequency hopping sequences are assigned may consist of all of the transmitting nodes in the network, or else only a certain subset of the nodes (e.g., only those located at/near an identified choke point). Also, the assignments may be effective for certain nodes (e.g., all or a subset) for certain times, such as during heavy network use times only, only in response to detected congestion (e.g., for a period of the congestion), or all the time.

It may often be the case where there are a certain number of frequency bands, including the specific frequency hopping sequences, to assign, and that number is not enough to meet the frequency diversity criteria above (not sharing a frequency with neighbors or hidden neighbors). As such, in one or more embodiments herein, the management node may assign all but a particular one of the number of frequency hopping sequences (e.g., in succession from choke points to minimal transmission nodes), and may then assign the last frequency hopping sequence to nodes not already having an assigned frequency hopping sequence. For example, by starting with the choke points in the network, any node not having been assigned a frequency hopping sequence before there is only one unassigned frequency hopping sequence left may share that last sequence, as they may not produce as much traffic, and may not be located within the regions of congestion 620.

According to the embodiments herein, a "frequency hopping sequence" may be used to indicate a variety of specific implementations of assigned frequencies, including the specific frequency hopping sequences, which, notably, may comprise orthogonal frequencies at any given point in time, as may be understood by those skilled in the art (that is, generally, non-conflicting frequencies/bands). In particular, as will be understood by those skilled in the art, frequency hopping, also referred to as "frequency-hopping spread spectrum" (FHSS), is a method of transmitting radio signals by rapidly switching a carrier among many frequency channels. That is, in frequency hopping networks (e.g., wireless or other shared media), time frames are divided into regular timeslots, each one operating on a different frequency (e.g., frequency band). A reference clock may be provided for the time frames for an entire network (e.g., mesh/cell), and a media access control (MAC) layer of each node divides time into timeslots that are aligned with the timeslot boundary of its neighbor (e.g., parent node). According to the techniques herein, however, unlike conventional frequency hopping, the sequence need not be known in advance by the receiver.

Figure 7A:
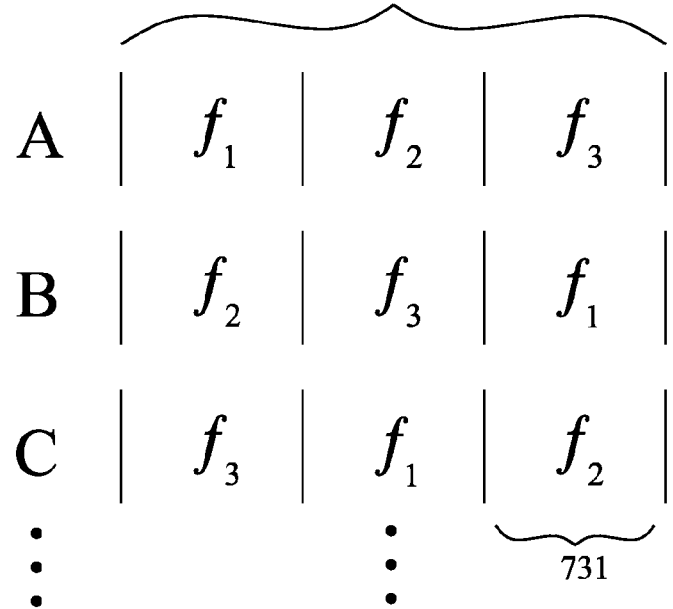
FIGS. 7A-D illustrate examples of assigned frequency hopping sequences.

In particular, as shown in FIG. 7A, within frequency hopping sequences 730a (referenced herein as "730" generally), labeled individually as "A", "B", "C", etc., center (carrier) frequencies $f_1$-$f_3$ are divided among generally regular timeslots 731, each one operating on a different frequency (and hopping in orthogonal frequency sequences). A reference clock may be provided for the time frames for an entire network (e.g., mesh/cell), and a MAC layer 212 of each node 200 divides time into timeslots that are aligned with the timeslot boundary of its neighbor (e.g., a parent node). Generally, a transmission in a frequency hopping network is configured for complete transmission (e.g., and resultant acknowledgment or "ACK") within a single timeslot 731. As such, as described below, when a receiving node receives a transmission on an unknown frequency, the sequence need not be known by the receiver so long as the initial transmission's frequency (e.g., band) is adequately determined. (In other embodiments, the receiver is aware of the sequences, or can at least correlate them, e.g., simple sequential progression, accordingly, in order to keep up with continued transmissions over multiple frequency hopped timeslots.)

Figure 7B:
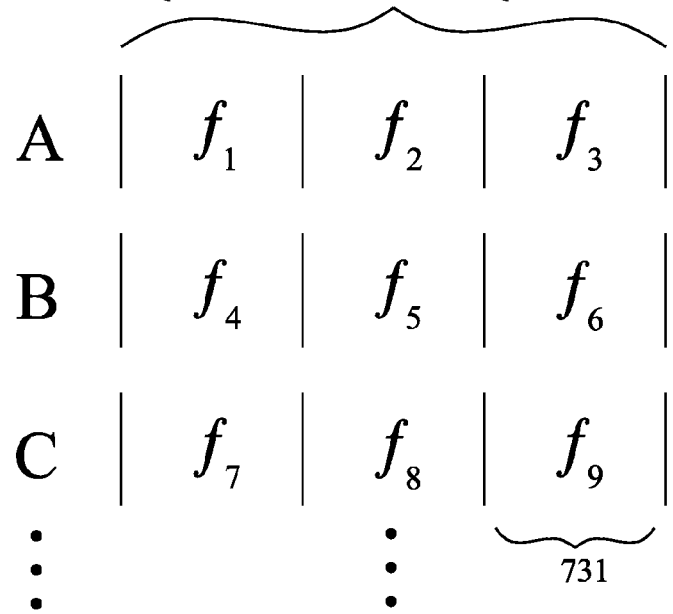

Note that in FIG. 7A, the frequency hopping sequences A, B, and C, share the same three center frequencies (e.g., and surrounding band) in a different order, i.e., so no frequency hopping sequence is assigned the same frequency for a given timeslot 731. However, as shown in FIG. 7B, it is also possible to assign center/carrier frequencies within frequency hopping sequences 730b that are not shared between the sequences. For example, as shown, the sequence A comprises frequencies $f_1$-$f_3$, while B and C comprise $f_4$-$f_6$ and $f_7$-$f_9$, respectively. This may be particularly useful where the timeslots are not synchronized between the frequency hopping sequences (e.g., each node transmits within its frequency hopping sequence according to its own clock) in order to avoid overlapping of frequencies.

Figure 7C:
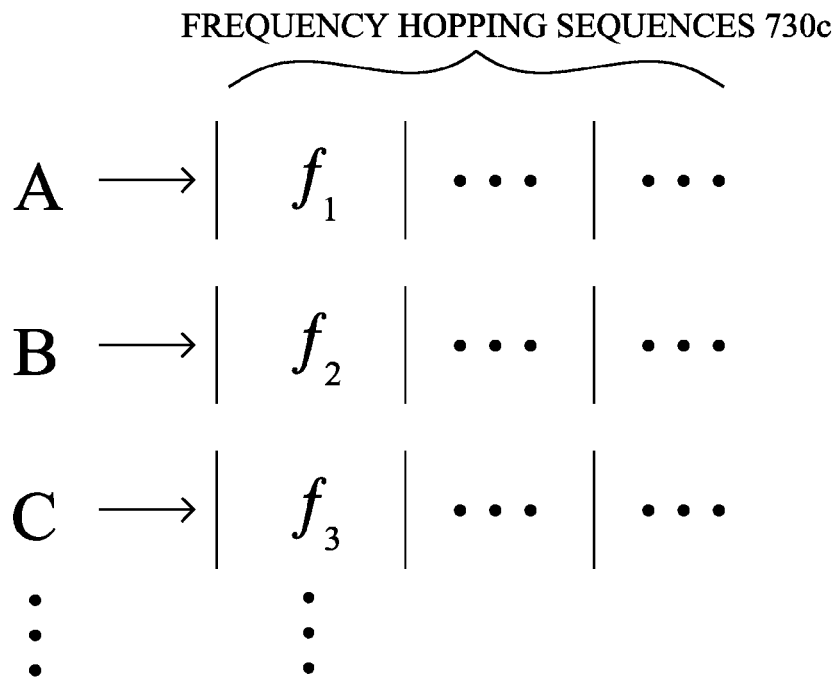
Figure 7D:
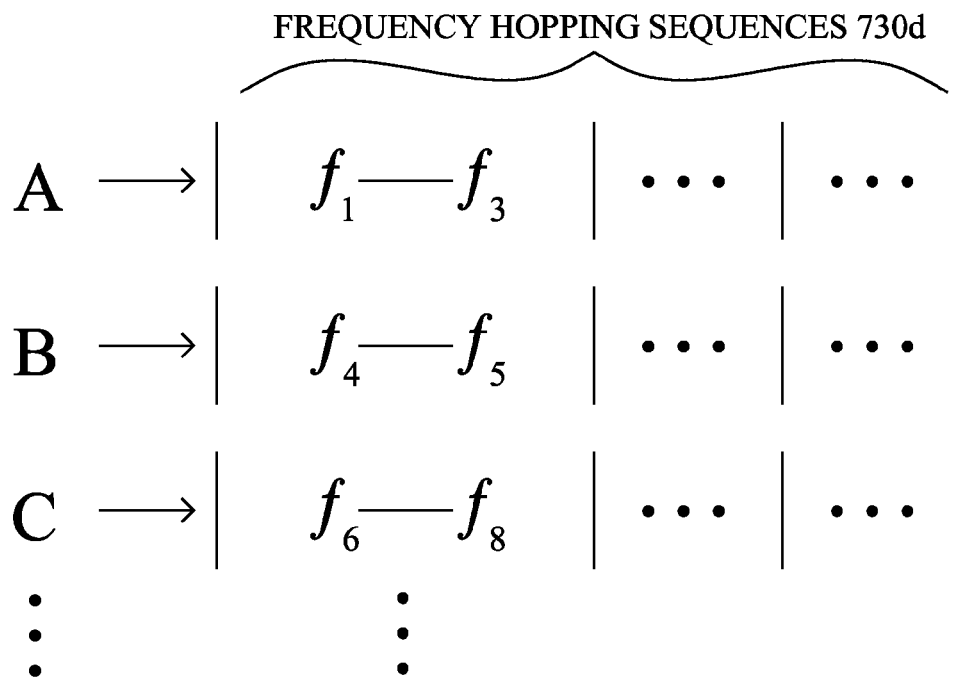

Notably, references are made herein to a "frequency" within a frequency hopping sequence, and such references may generally be used to indicate a single center/carrier frequency around which a transmission may occur, i.e., within a frequency band. Alternatively, a "frequency" may imply a set of frequencies that consists of one or more individual center/carrier frequencies from which the transmitter may transmit (e.g., selecting a single center/carrier frequency from the set). For example, FIG. 7C illustrates a comparative example of single-center-frequency timeslots in hopping sequence 730c (similar to the example in FIG. 7A above), while FIG. 7D illustrates the example where sequence 730d comprises timeslots of a plurality of optional frequencies. In particular, illustrative frequency hopping sequence A comprises center frequencies $f_1$-$f_3$ in its first timeslot from which a transmitter may select as its center (carrier) frequency, while B and C comprise $f_4$-$f_5$ and $f_6$-$f_8$, respectively. Note that a different number of frequencies may be contained within a set, including a single frequency, such as for assigning sets with more frequencies to more congested nodes (choke points). Also note that while the frequencies shown within the sets of FIG. 7D are a consecutive range, and this is merely an illustrative example, such that alternative embodiments may comprise different arrangements (e.g., $f_1$, $f_5$, and $f_7$, in one timeslot, and $f_2$, $f_6$, and $f_9$ in another, etc.).

According to a specific illustrative embodiment of the techniques described herein, i.e., as one example of how frequency hopping sequences can be assigned according to the description above, the management node may, using the topology and optionally other information, rank the nodes based on "traffic" at the nodes. In particular, "traffic" characteristics at the nodes may be used to adaptively detect congested nodes/links where the most collisions occur or are expected to occur. For instance, traffic characteristics may include a number of neighbors of the node, or even a number of neighbors and hidden neighbors of the node. Other example traffic characteristics that may be used for the ranking include, but are not limited to including, a number of child nodes of each node in DAG, an amount of average traffic at the node (e.g., determined by various network statistic measurements, such as available bandwidth, utilized bandwidth, packet counts, dropped/tagged packets, etc.), an amount of current traffic at the node, an amount of expected traffic at the node (e.g., based on location, DAG depth, a priori knowledge/configuration, etc.), and a priority of the traffic at the node. Combinations of traffic characteristics, e.g., weighted combinations, may also be used as well (for example, to break "ties").

FIG. 8 illustrates an example table/list 800 that may be stored within memory 240 and managed by, e.g., topology management process 248. For instance, the simplified table 800 may comprise a plurality of entries 850, each comprising a ranking 805, a node identification (ID) 810, and an assigned frequency hopping sequence field 730. The management node may arrange/order the nodes of the network in the table according to their ranking (e.g., number of neighbors, number of children, etc.), which as used merely as an example herein, may be completed in a descending order (i.e., the "highest" ranked node in the list would be the node with the most "traffic").

According to this specific illustrative embodiment, the management node assigns is a first frequency band (frequency, range, sequence, etc.) to the highest ranked node in the table 800, noting that the node has a frequency hopping sequence assigned to it. That is, the management node assigns a first unassigned particular frequency hopping sequence (e.g., "A") of a plurality of frequency hopping sequences (e.g., "A" through "F", referenced generally herein as frequency hopping sequences 730 described above) to a highest ranked node in the list not previously having been assigned a frequency hopping sequence.

Figure 9A:
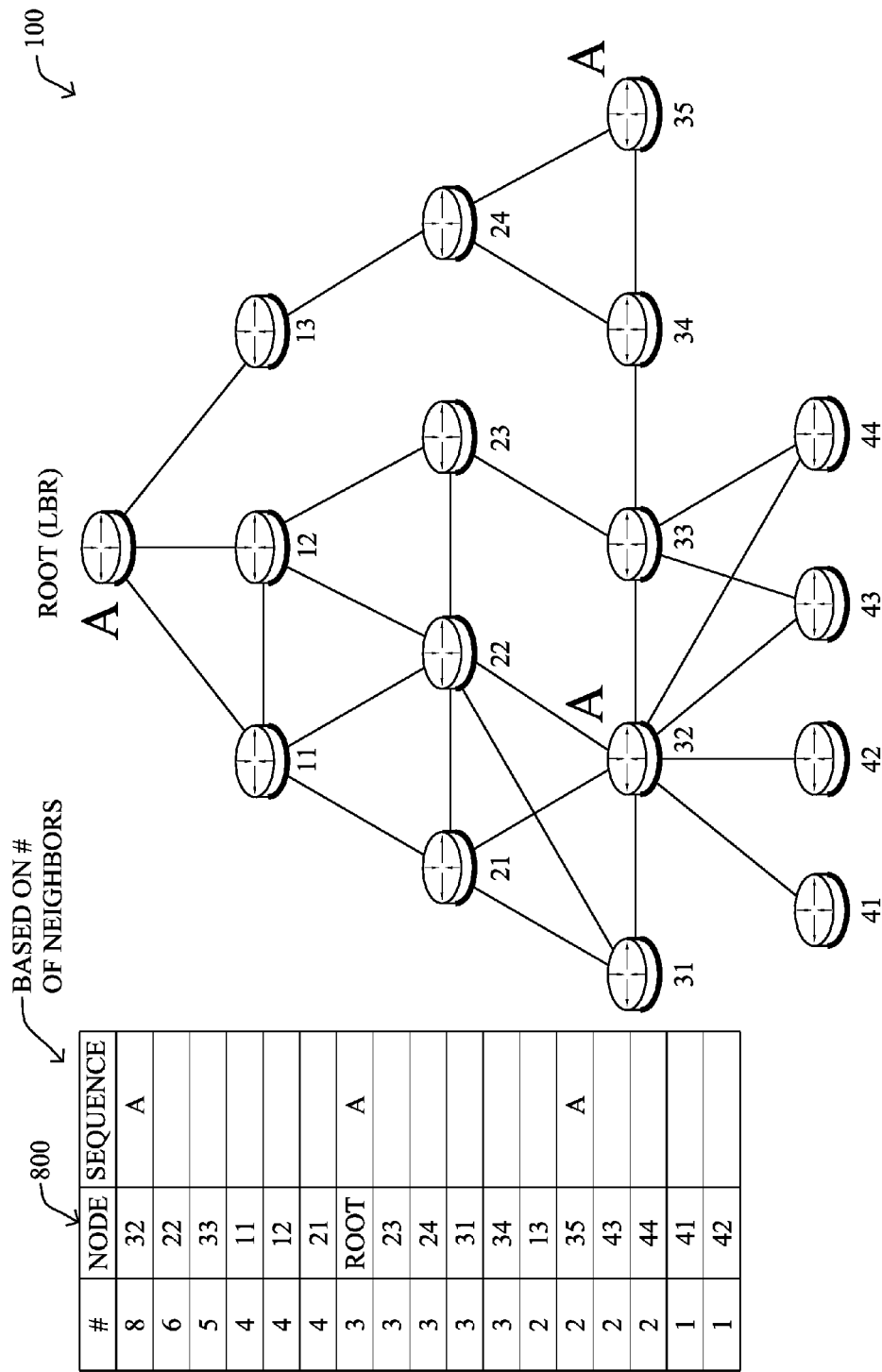
FIGS. 9A-D illustrate an example of assigning frequency hopping sequences in the network of FIG. 1.

In particular, FIG. 9A illustrates the assignment of frequency hopping sequences within table 800 in relation to the network 100 of FIG. 1, where the ranking is based on a number of neighbors of each node. For instance, in any direction, node 32 has eight neighbors, the most of any node in the network 100, and as such, may be the highest ranked node. The second highest node is node 22, with six neighbors, and so on. (Note that in certain embodiments, such as where DAGs are utilized or where certain nodes provide access to other networks, e.g., a WAN, or are configured as collector/aggregator nodes, then those nodes may be artificially placed higher, e.g., at the top, of the ranked list 800.) By starting at a first unassigned frequency hopping sequence, e.g., A, the highest ranked node 32 may be assigned to this frequency hopping sequence, as mentioned above.

The management node may then search/scan (e.g., from the top down) for other nodes which are not direct or hidden neighbors of the node identified above (node 32) and assigns it the same frequency hopping sequence. In other words, the management node assigns the particular frequency hopping sequence A to a next node in the ordered list that is not a neighbor and is not a hidden neighbor of the highest ranked node. For instance, the next node in the list that not a neighbor (direct or hidden) of node 32 is the root node. That is, nodes 22, 33, 11, 12, and 21 are all either direct neighbors or hidden neighbors of node 32.

This particular frequency hopping sequence A continues to be assigned to any subsequent nodes in the ordered list 800 that are not a neighbor and are not a hidden neighbor of any node previously assigned to the particular frequency hopping sequence. As shown in FIG. 9A, this results in node 35 also being assigned to frequency hopping sequences A.

Once the bottom of the list 800 is reached for the particular frequency hopping sequence's search (e.g., node 42), then the process may repeat for a next unassigned frequency hopping sequence, e.g., assigning frequency hopping sequence B to the highest unassigned node, node 22, and then also to any node not a neighbor or hidden neighbor to a node previously assigned to frequency hopping sequence B in order of the list (e.g., node 22).

Figure 9B:
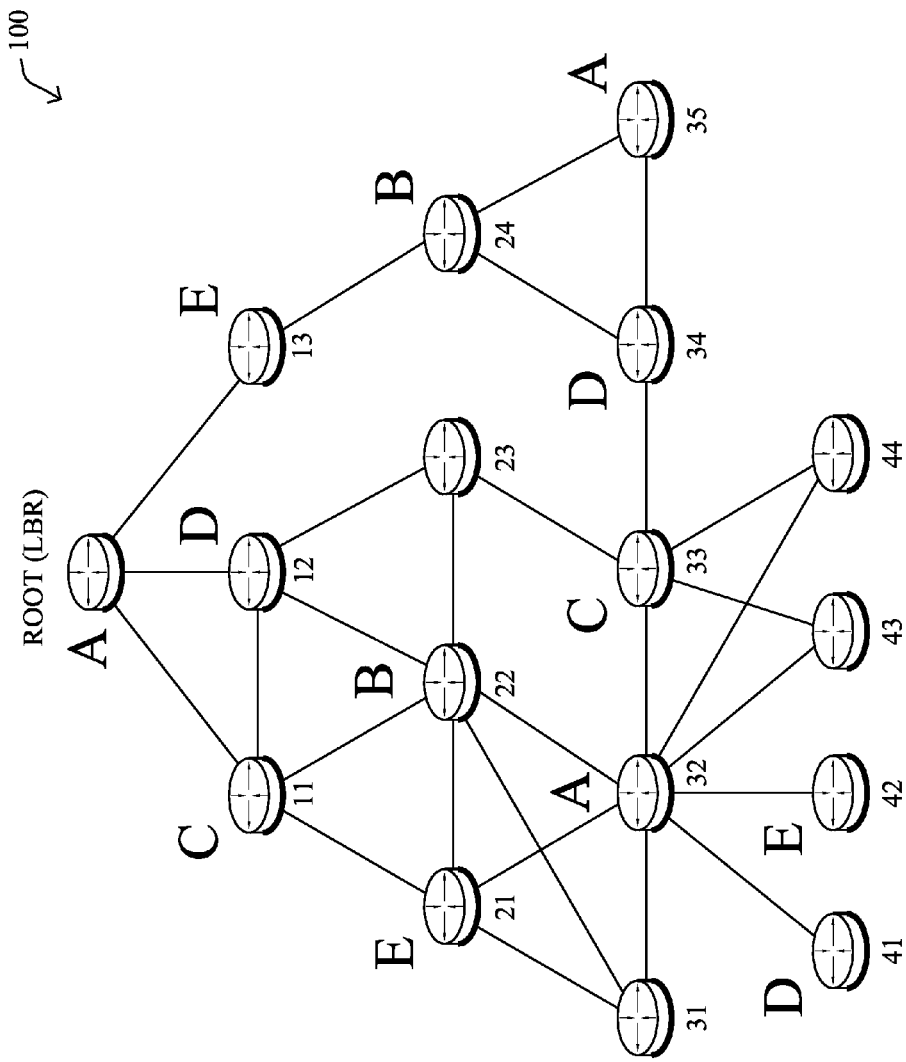

This process continues to loop back to new unassigned frequency hopping sequences until all of the nodes in the network (or all of a subset of nodes) have been assigned a frequency hopping sequence. As discussed above, however, there may be instances where there are not enough frequency hopping sequences to assign to the nodes in the network based on the process above. (Note that while the above example suggested frequency hopping sequences A-F, to meet the criteria for all nodes, frequencies A-I would be required.) Accordingly, as shown in FIG. 9B, the process of assigning may continue until all frequency hopping sequences save one have been assigned (e.g., assigning frequency hopping sequences A-E, but not F).

Figure 9C:
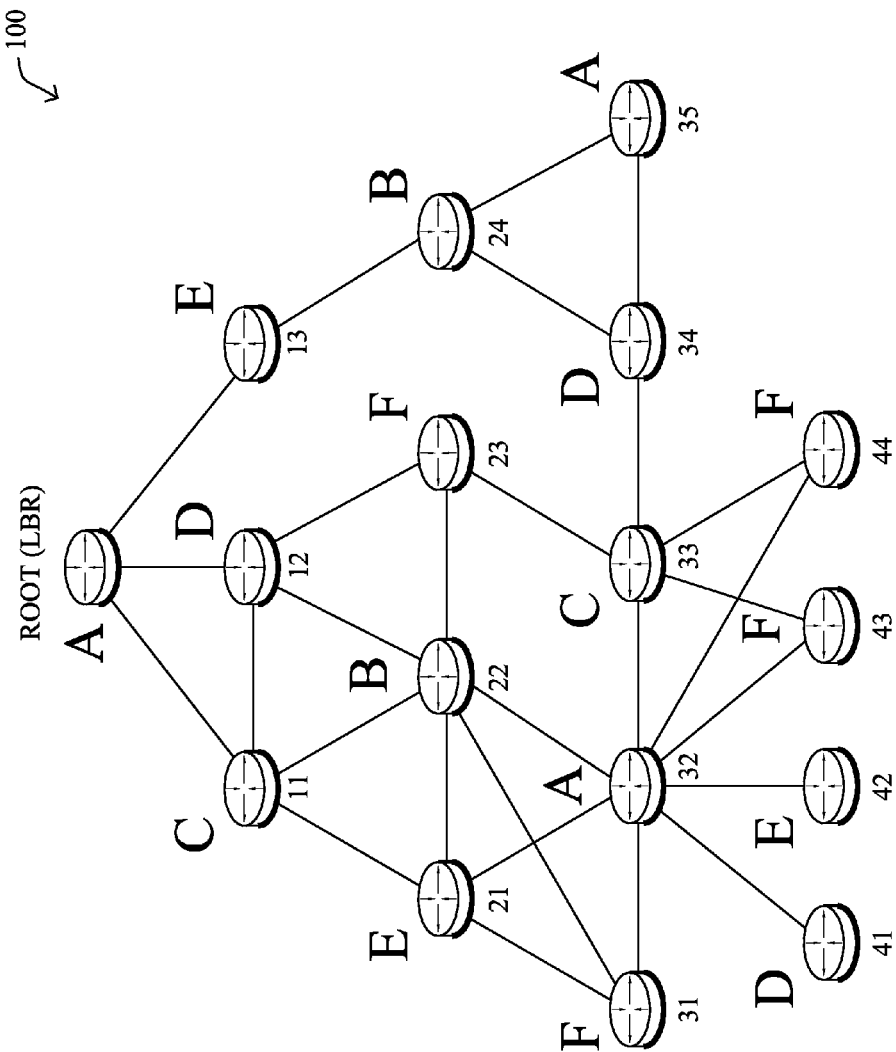
Figure 9D:
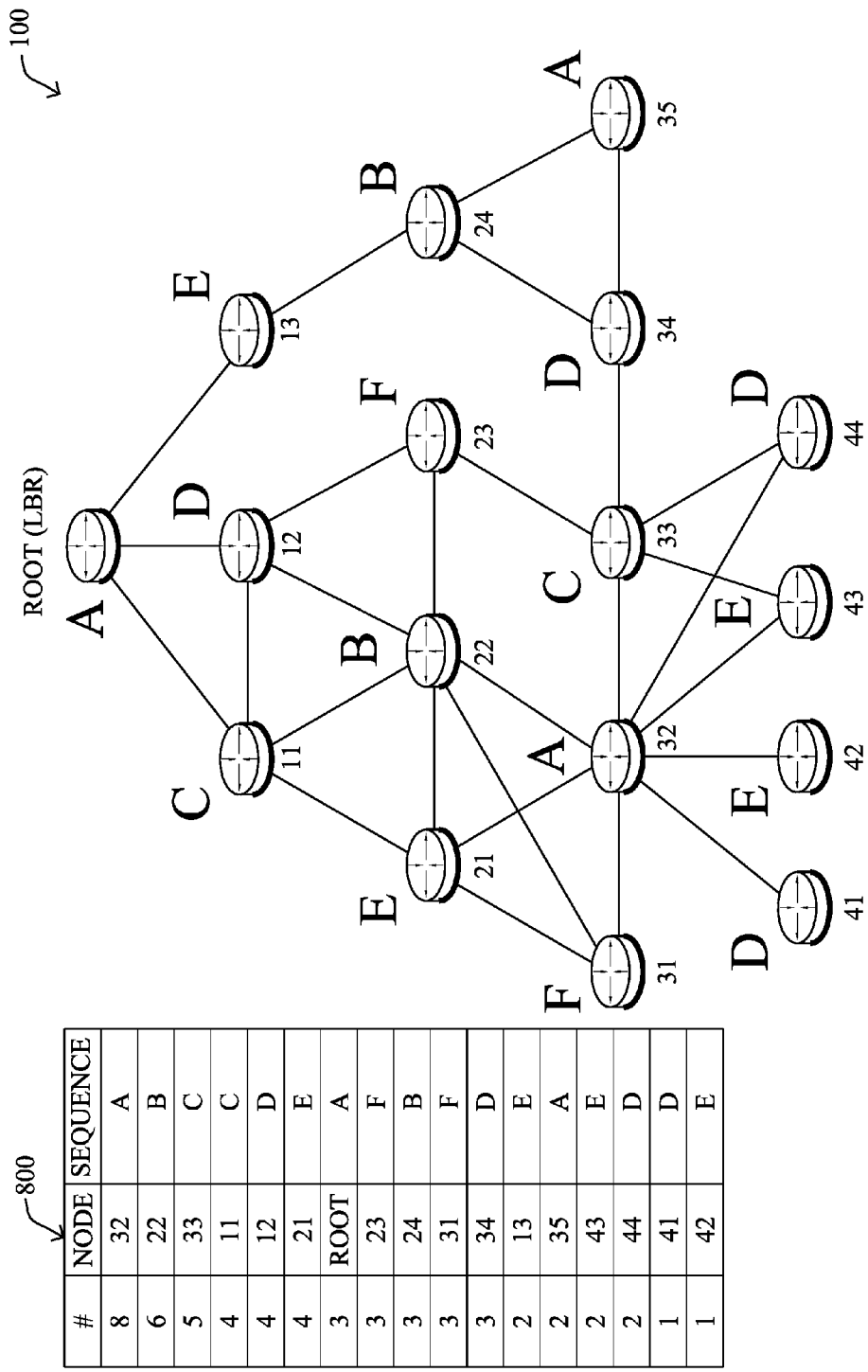

At this point, the management node may illustratively operate according to either of the following two modes as described with reference to FIGS. 9C and 9D, respectively. As shown in FIG. 9C, once reaching a last unassigned frequency hopping sequence, the last frequency hopping sequence F may be assigned to all remaining nodes in the list/table 800 which have not yet been assigned a frequency hopping sequence (e.g., nodes 23, 31, 43, and 44). Note that generally, these remaining nodes may be associated with lower rankings in the list 800, and as such may not have as much traffic to deal with, and may not be suffering from congestion. As such, it may not be necessary to ensure frequency diversity between these nodes, as they may infrequently be transmitting data, and thus may not have as many contentious transmissions as the rest of the network.

However, in certain situations, it may be beneficial to divide these remaining nodes into different frequency hopping sequences, particularly where the remaining nodes may be clustered in particular areas of the network, e.g., at leaf nodes (generally ranking lowest in the list 800) that may all share a same parent (which may be congested due to the number of child nodes it has). Accordingly, as shown in FIG. 9D, the last unassigned frequency (F) may be assigned in the manner described above (to the highest ranked unassigned node and any subsequent non-neighbor nodes), and then the frequency assignment sequence may assign previously assigned frequency hopping sequences, e.g., to a next highest ranked node in the list not previously having been assigned a frequency hopping sequence. For instance, in one embodiment, the frequency hopping sequences may "roll-over", such that the next frequency hopping sequence to assign after the last frequency hopping sequence F is frequency hopping sequence A. However, since frequency hopping sequence A is assigned to the absolute highest ranked node in the list (e.g., node 32), it may be beneficial to assign the frequency hopping sequences in the reverse (e.g., A-F, then F-A), as shown in FIG. 9D.

Notably, as described above, the ranking is based on certain traffic characteristics, and with reference to FIGS. 9A-D, the chosen characteristic was the number of neighbors of each node in the network 100 of FIG. 1. However, it should be appreciated that the different ranking of nodes, whether based on different chosen traffic characteristics or otherwise in response to changes in the traffic characteristics (topology changes, real-time traffic measurements/statistics, etc.), can change the assignment of frequency bands accordingly. This change of assignments may be seen with respect to FIGS. 10A-C.

Figure 10A:
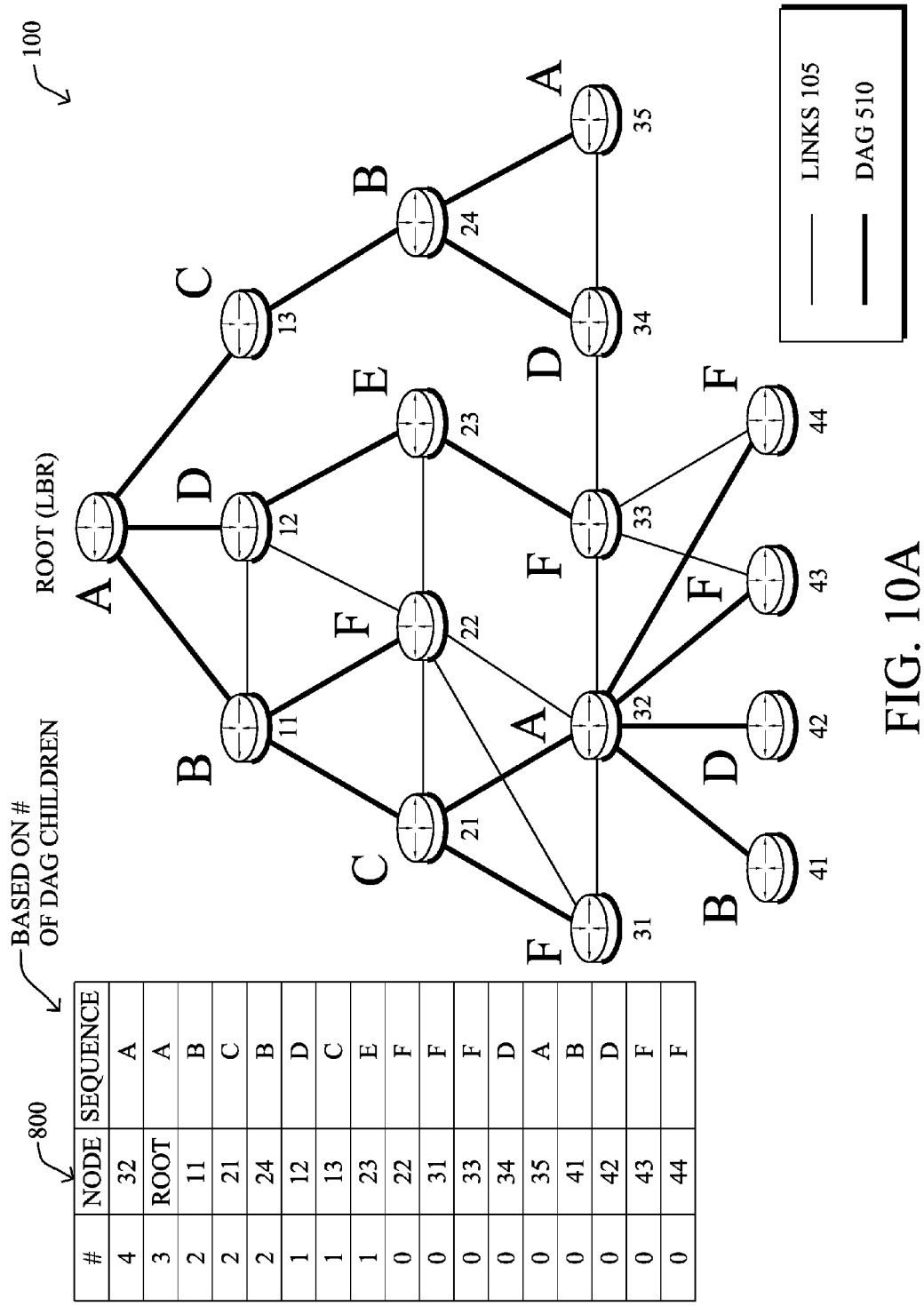
FIGS. 10A-C illustrate alternative examples of assigning frequency hopping sequences in the network of FIG. 1.

In particular, FIG. 10A illustrates a ranking based on the number of child nodes each node has in the DAG 510 of FIG. 5. For instance, while node 32 remains at the top of the list 800 with the most children (four), the rest of the nodes have been adjusted accordingly (e.g., next being the root node with three child nodes, then node 11 with two, etc.). As can be seen in comparison with FIG. 9C (one example implementation to assign frequency hopping sequences A-F to all of the nodes), certain assignments have been changed. Similarly, an assignment that is different from FIG. 9C is shown in FIG. 10B, when the ranking is based on a number of nodes within sub-DAGs of each node (where, in this instance, the root node is always located at the top of the list since its sub-DAG is is the entire DAG).

Figure 10B:
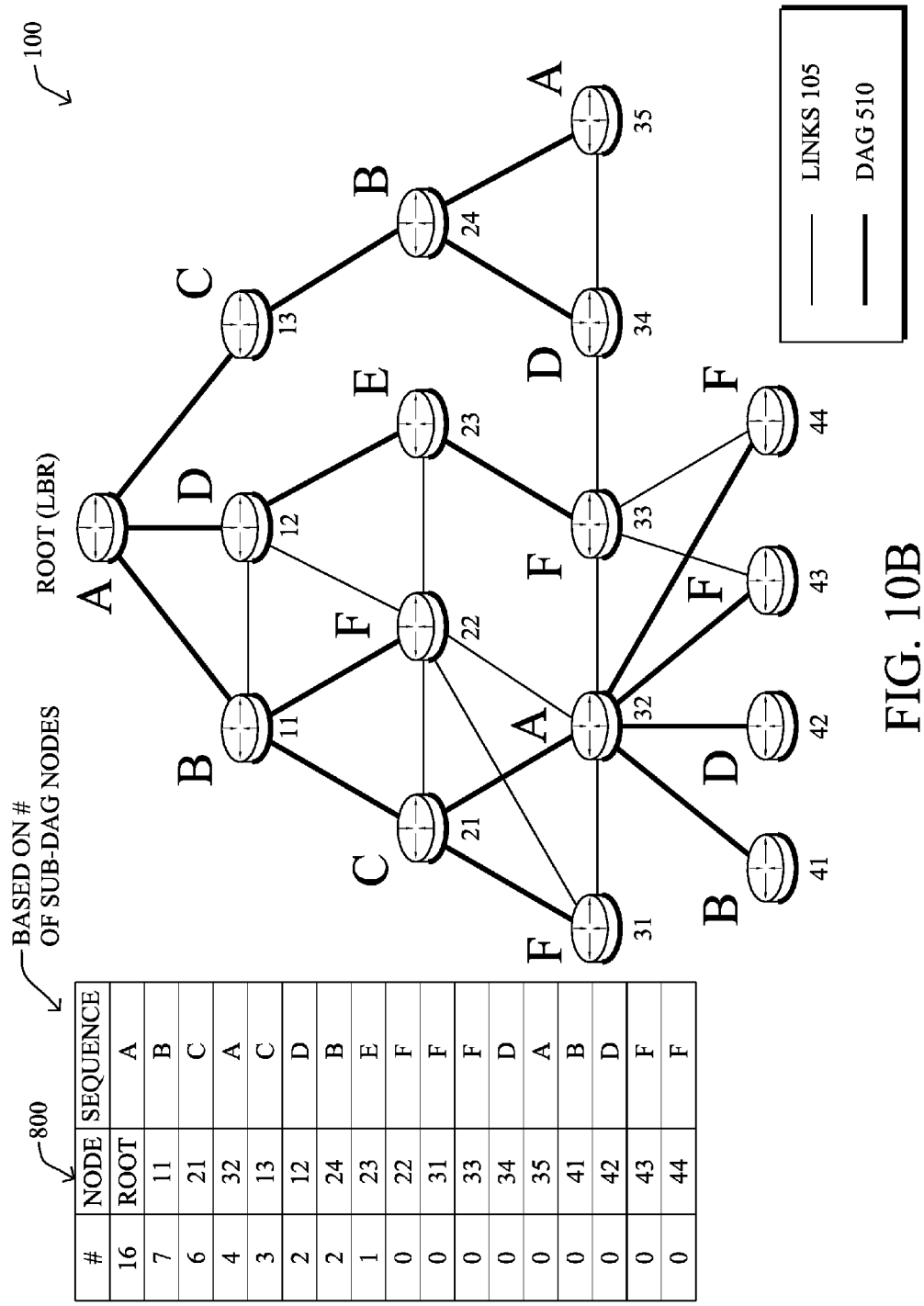
Figure 10C:
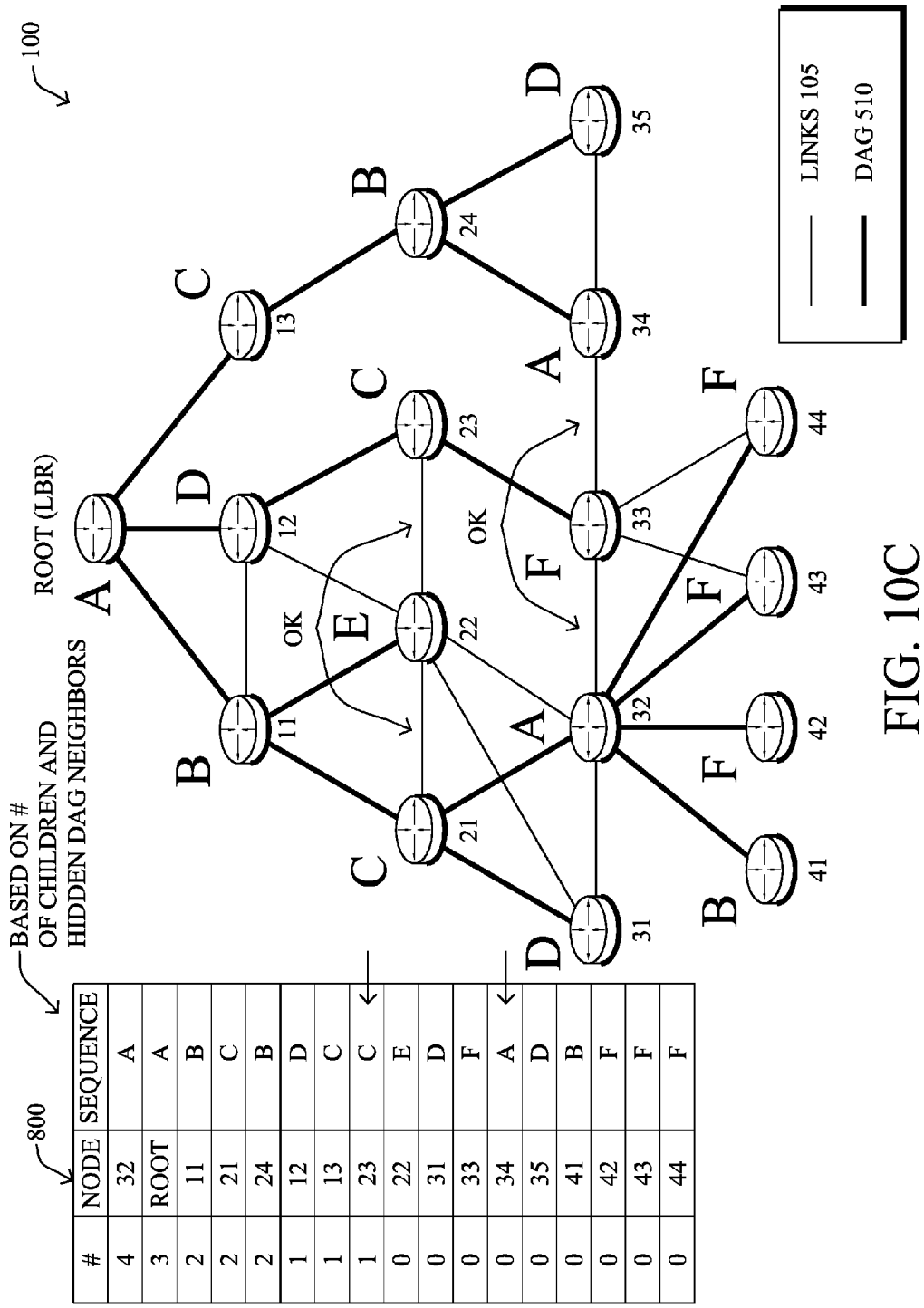

Note that FIGS. 10A and 10B achieved the same assignment result, even with the different order/rank of the nodes. This is due to the fact that neighbors and hidden neighbors are the same regardless of ranking. In the case of FIGS. 10A and 10B, the difference in ranking did not change the assignment of frequency bands, however both were different from FIG. 9C's assignments. The actual assignments are thus not as important as the diversity between the congested nodes in the network, and each example assignment (in the illustratively simplified network topologies) substantially achieves this result.

Note further that the definition of what nodes are hidden neighbors may be adjusted slightly for use with DAG topology routing. For instance, while generally hidden neighbors are any two nodes that can communicate with a shared/intermediate neighbor node at the same time, in a DAG, this may be determinably not the case. For instance, with reference to FIG. 10C, nodes 21 and 23 are not hidden neighbors via node 22, since neither nodes 21 nor 23 would communicate with node 22 on the same frequency hopping sequences according to the DAG 510. While node 22 may hear transmissions from both nodes 21 and 23, node 22 would ignore the signals in either event (e.g., filtering out the frequency bands), thus their potential collision is irrelevant. Accordingly, as shown, node 23 can join (be assigned to) frequency hopping sequence C, since node 21 does not intend to send to node 22 (the same is true for adding node 34 to frequency hopping sequence A, having no contention with node 32). Note, however, that node 23 cannot be assigned to frequency hopping sequence B, since node 11 could transmit to node 22 (downward DAG transmissions). In this instance, if node 11 is trying to transmit to node 22 while node 23 was also transmitting, the two transmissions could collide at node 22.

Transmission:

Nodes 200 in the network that is configured for transmissions may be configured to receive assignment of a particular frequency hopping sequence from a management node of the network as described in detail above. For instance, this may result in every transmitting node receiving such an assignment, or else a subset of the nodes as noted above.

In response to a particular transmitting node (e.g., node 32) determining that it has a transmission (e.g., a message/packet 300, etc.) to transmit within the network over a shared media (e.g., to receiving node 21), the transmitting node identifies the particular frequency band on which the node is to transmit based on its assigned frequency hopping sequence. This identification may imply that a single frequency is recalled, or else selected from within a set (band) of individual frequencies. Also, in one or more embodiments herein, the identification may, more particularly, be to determine a current (or next suitable) frequency within a frequency hopping sequence is to be utilized for the transmission.

According to one or more embodiments herein, before transmitting a message (e.g., packet) 300 to its destination (receiver node), the transmitting node first transmits a nominal power in the particular frequency it intends to transmit the packet. This short burst of radio power serves as an indication of forthcoming transmits over a specific frequency. This transmission indication signal helps the receiver hone its filters 213 to receive the forthcoming transmission/packet in the frequency of the transmission indicator, and "notching out" all other frequency bands as described below. Shortly after the indication signal, the node may then transmit the message (data packet) 300 on the same frequency it used for the transmission indication.

Figure 11:
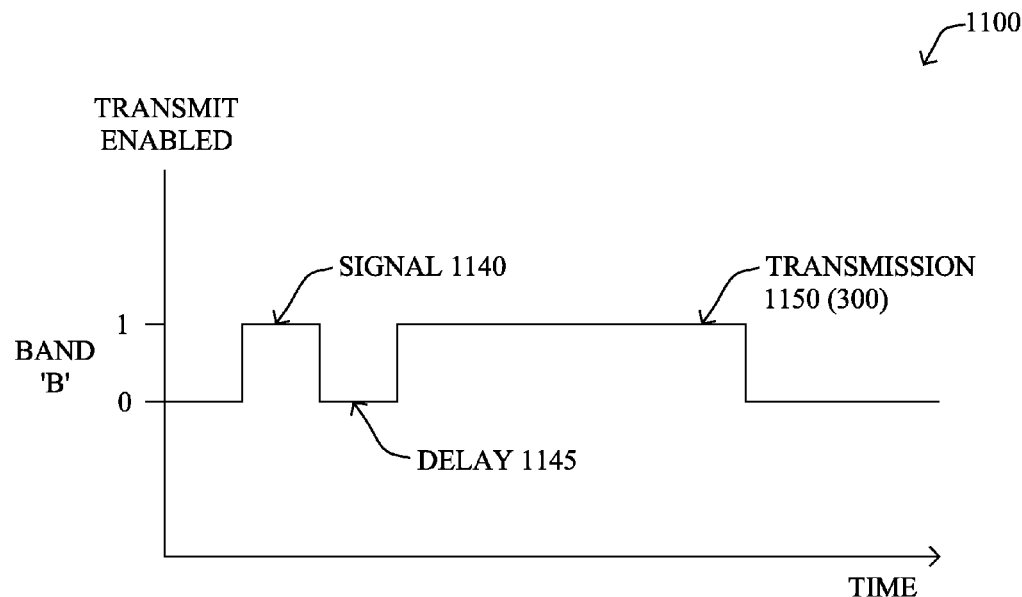
FIG. 11 illustrate an example transmission sequence.

FIG. 11 illustrates an example transmission timing sequence 1100 in accordance with one or more embodiments herein. In particular, the transmission indication signal 1140 mentioned above may be sent first, and then after some delay 1145, the message 1150 (e.g., packet 300) may be transmitted. Note that the delay 1145 may be based on an expected processing time by the receiver, or alternatively, may be zero, such as where the signal 1140 is merely a portion of or extension of preamble 305.

Figure 12A:
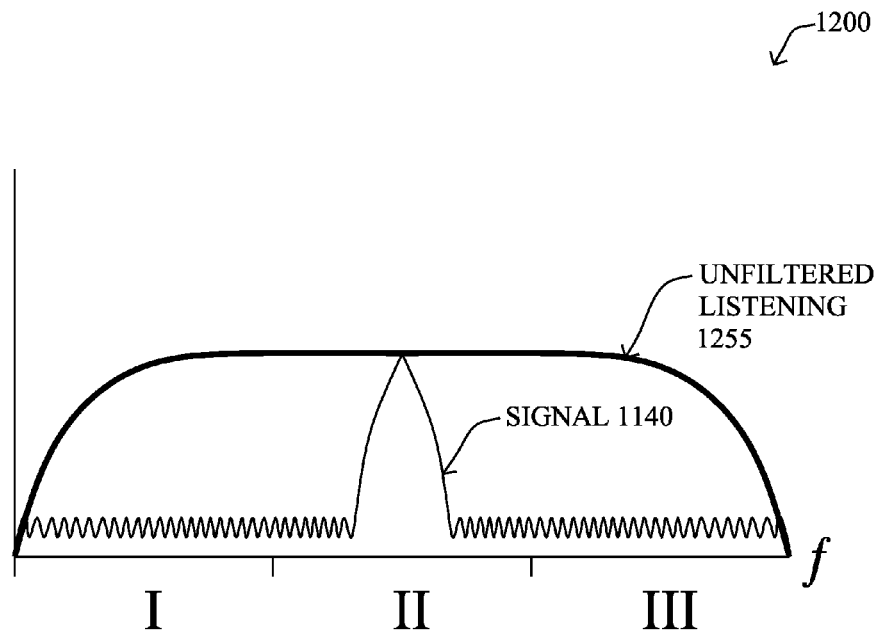
FIGS. 12A-C illustrate an example reception sequence.

Reception:

Nodes 200 in the network 100 may be configured to be placed in a listening mode while not transmitting. During this listening mode, the nodes listen to a plurality of frequency bands within the network, such as a range of frequencies generally utilized within the network (e.g., within the range to cover frequencies/bands in frequency hopping sequences A-F above), and wait for an indication of transmission (signal 1140) from other nodes within any frequency band. For instance, various notch filters and/or band filters (filters 213 generally) may be dropped, allowing reception of any frequency. As shown in FIG. 12A, for example, a frequency domain representation 1200 of a receiver in listening mode, may have listening enabled (line 1255) for all frequencies (e.g., simply "I", "II", and "III" for discussion), and may receive signal 1140 within frequency band II. Note, particularly, that the receivers may be configured to listen to any possible frequency/band at the same time, or, in certain embodiments, may only listen to any possible frequency/band of any possible frequency hopping sequence timeslot at the time (e.g., with reference to FIG. 7B above, listening to bands corresponding to frequencies $f_1$, $f_4$, and $f_7$ during the first timeslot, $f_2$, $f_5$, and $f_8$ during a second timeslot, etc.).

Figure 12B:
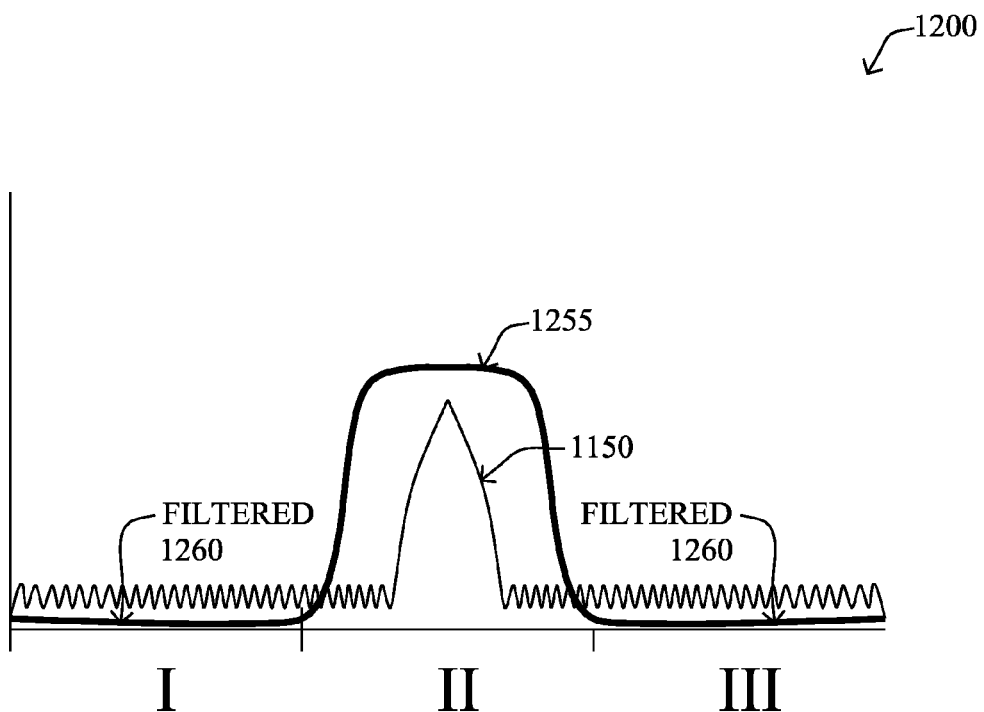

In response to detecting a transmission indication signal 1140 on a particular frequency band of the plurality of frequency bands (as shown in FIG. 12A), the listening/receiving node brings up its filtering mechanism and notches out all frequency bands other than the one over which it has just received the transmission indication. FIG. 12B illustrates the filtering out of all frequency bands other than the particular frequency band on which the signal 1140 is received (portions 1260 of enabled listening line 1255) in order to enhance (e.g., allow) reception of the transmission 1150, accordingly. For instance, frequencies (e.g., bands) I and III may be filtered out to allow reception at frequency (e.g., band) II.

Figure 12C:
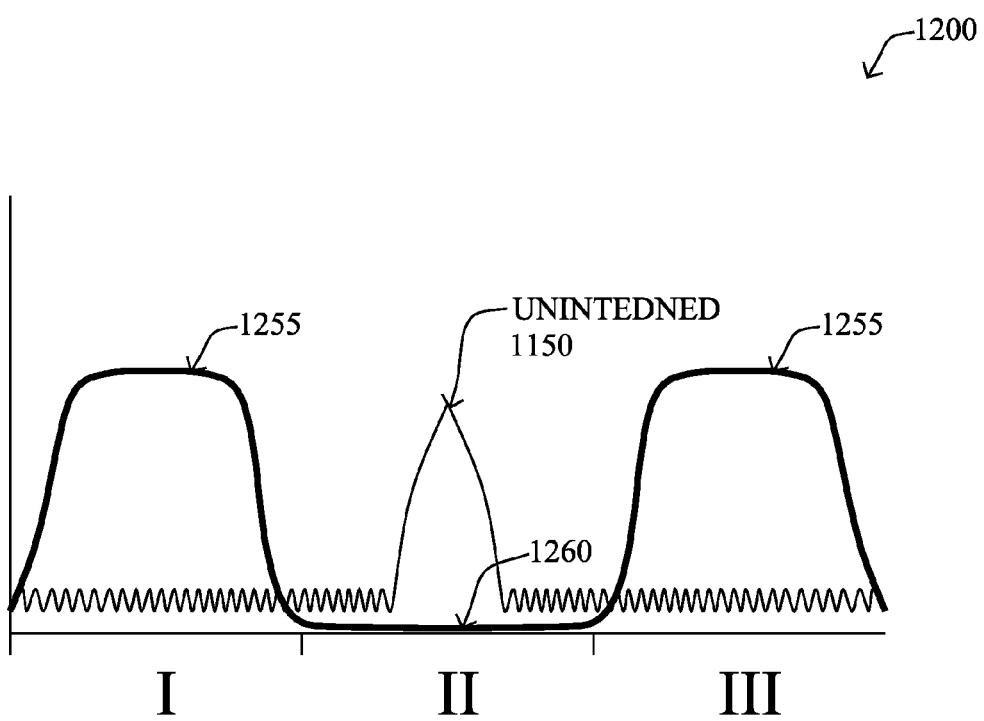

Notably, in one or more embodiments herein, the receiving node may be able to determine whether it is an intended recipient of the transmission 1150/300. For instance, this determination may be made by examining/analyzing the header 310 of a received packet 300 to identify the destination address 314 of the transmission. If the address matches that of the receiving device, then the transmission may be fully received. However, in response to the address (or other indicator) not corresponding to the receiving node, then the node may invert its filters 313 to specifically exclude only the particular frequency band. For instance, as shown in FIG. 12C, the receiving node may ceasing the filtering out of all frequency bands of the plurality of frequency bands other than the particular frequency band (e.g., enabling reception on frequency bands I and III as shown by line 1255), and filtering out the particular frequency band (e.g., frequency band II, shown as filtered portion 1260 of line 1255). Note that this "notching out" of the unintended transmission 1150 may last for an expected duration of the transmission, e.g., based on a length field 316 of the packet 300, or else based on other consideration, such as a standard transmission length, a length of frequency hopping timeslots, etc.

Figure 13:
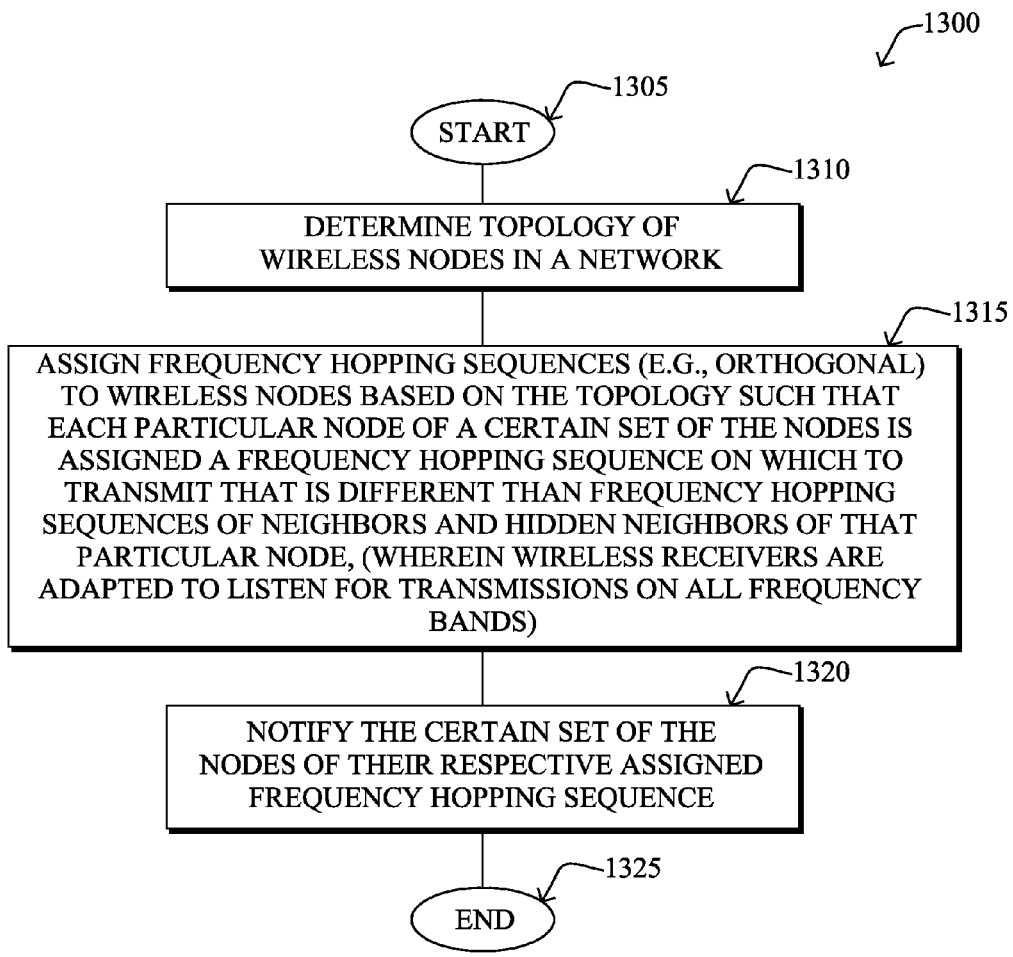
FIG. 13 illustrates an example simplified procedure for dynamically assigning frequency hopping sequences in a communication network.

Closing Remarks:

FIG. 13 illustrates an example simplified procedure for dynamically assigning frequency hopping sequences in a communication network in accordance with one or more embodiments described herein. The procedure 1300 starts at step 1305, and continues to step 1310, where a management node (e.g., the root node) determines the topology of nodes 200 in the network 100. Based on the topology as described in detail above, in step 1315 the management node assigns frequency hopping sequences (e.g., orthogonal) to the nodes such that each particular node of a certain set of the nodes is assigned a frequency hopping sequence on which to transmit that is different than frequency hopping sequences of neighbors and hidden neighbors of that particular node. As noted, receivers are adapted to listen for transmissions on all frequency bands (also described below with reference to FIG. 16). The management node may then notify the certain set of the nodes in step 1320 of their respective assigned frequency hopping sequence, and the procedure 1300 ends in step 1325, notably with the ability to restart to step 1305 in response to periodic timers, detected congestion, administrator control, etc.

Figure 14:
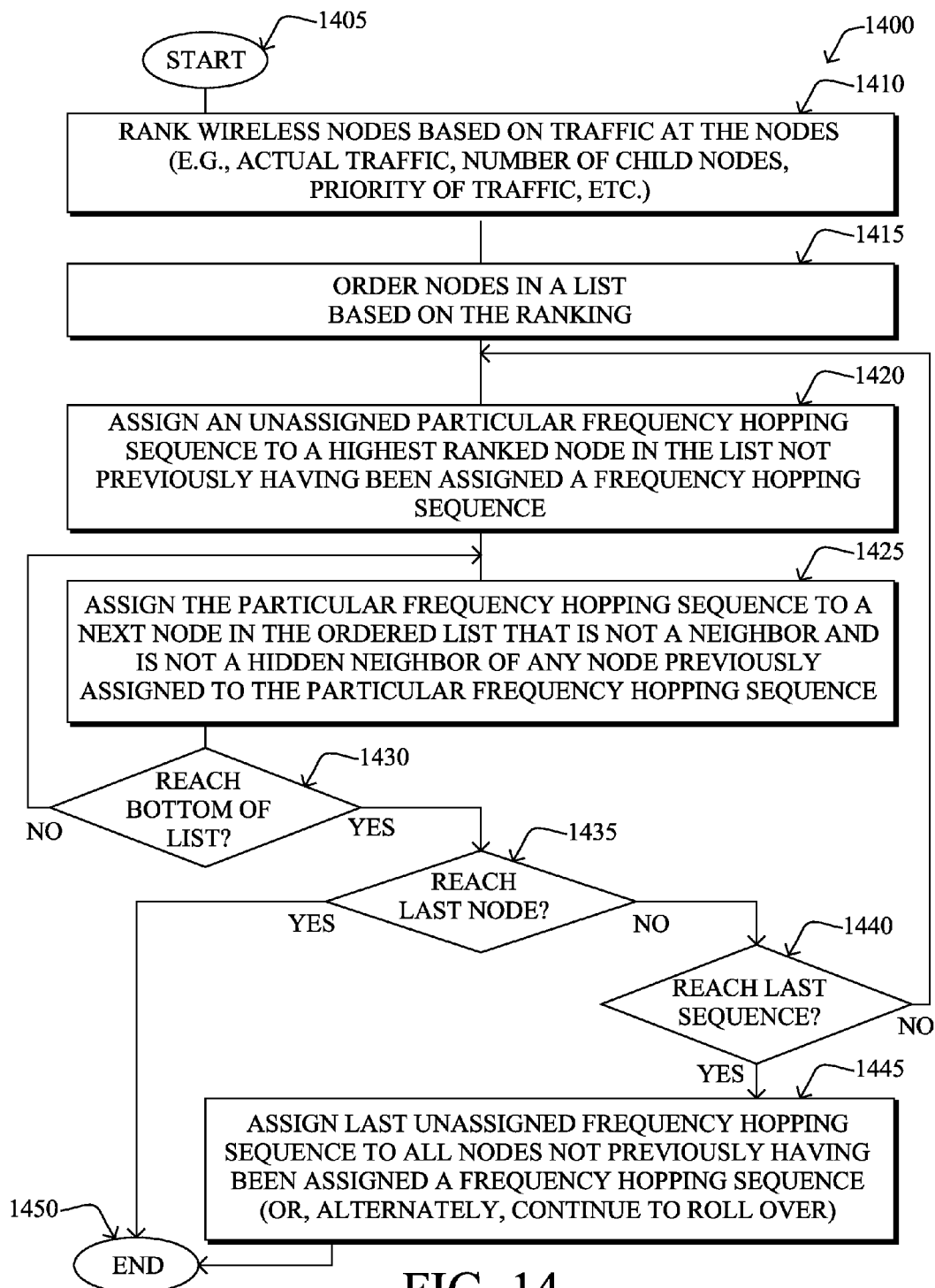
FIG. 14 illustrates another example simplified procedure for dynamically assigning frequency hopping sequences in a communication network.

In slightly more detail with respect to particular embodiments described above, FIG. 14 illustrates another example simplified procedure for dynamically assigning frequency hopping sequences in a communication network. This illustrative procedure 1400 starts at step 1405, and continues to step 1410, where the management node (e.g., root node) ranks the nodes based on traffic at the nodes. As described above, the traffic measurement may be based on, e.g., actual traffic, projected traffic, a number of child nodes, a priority of traffic, a number of total neighbors, etc. In step 1415, the management node orders the nodes in a list 800 based on the ranking.

By going through the ranked list, in step 1420 the management node assigns an unassigned particular frequency hopping sequence to a highest ranked node in the list not previously having been assigned a frequency hopping sequence. For instance, the first available frequency hopping sequence (e.g., "A" above) may be assigned to the highest ranked node in the list. Then, in step 1425, the management node continues down the list to assign this particular frequency hopping sequence to a next node in the ordered list that is not a neighbor and is not a hidden neighbor of any node previously assigned to the particular frequency hopping sequence. If there are more nodes before the bottom of the list in step 1430, then the procedure 1400 returns to step 1425 to assign the same particular frequency hopping sequence to other nodes.

Once the bottom of the list 800 is reached during the scan, then in step 1435 if there are no more nodes to assign (i.e., all nodes have been assigned a frequency band), then the procedure ends in step 1450. If, however, certain nodes remain unassigned, then in step 1440 is may be determined whether the last unassigned frequency band has been reached. If not, i.e., if there are two or more unassigned frequency hopping sequence left to assign, then the procedure returns to step 1420 to start at the top of the list to assign the new frequency hopping sequence to a new set of nodes, accordingly. On the other hand, if in step 1440 the last frequency has been reached, and there are additional nodes to assign frequency hopping sequences to (step 1435), then in step 1445 the management node may assign this last unassigned frequency hopping sequence to all remaining nodes of the list 800 not previously having been assigned a frequency hopping sequence. Alternatively, as mentioned above, in step 1445 the procedure may continue to roll over the assigned frequency hopping sequences (e.g., returning to step 1420 from step 1445). The procedure 1400 ends in step 1450.

Figure 15:
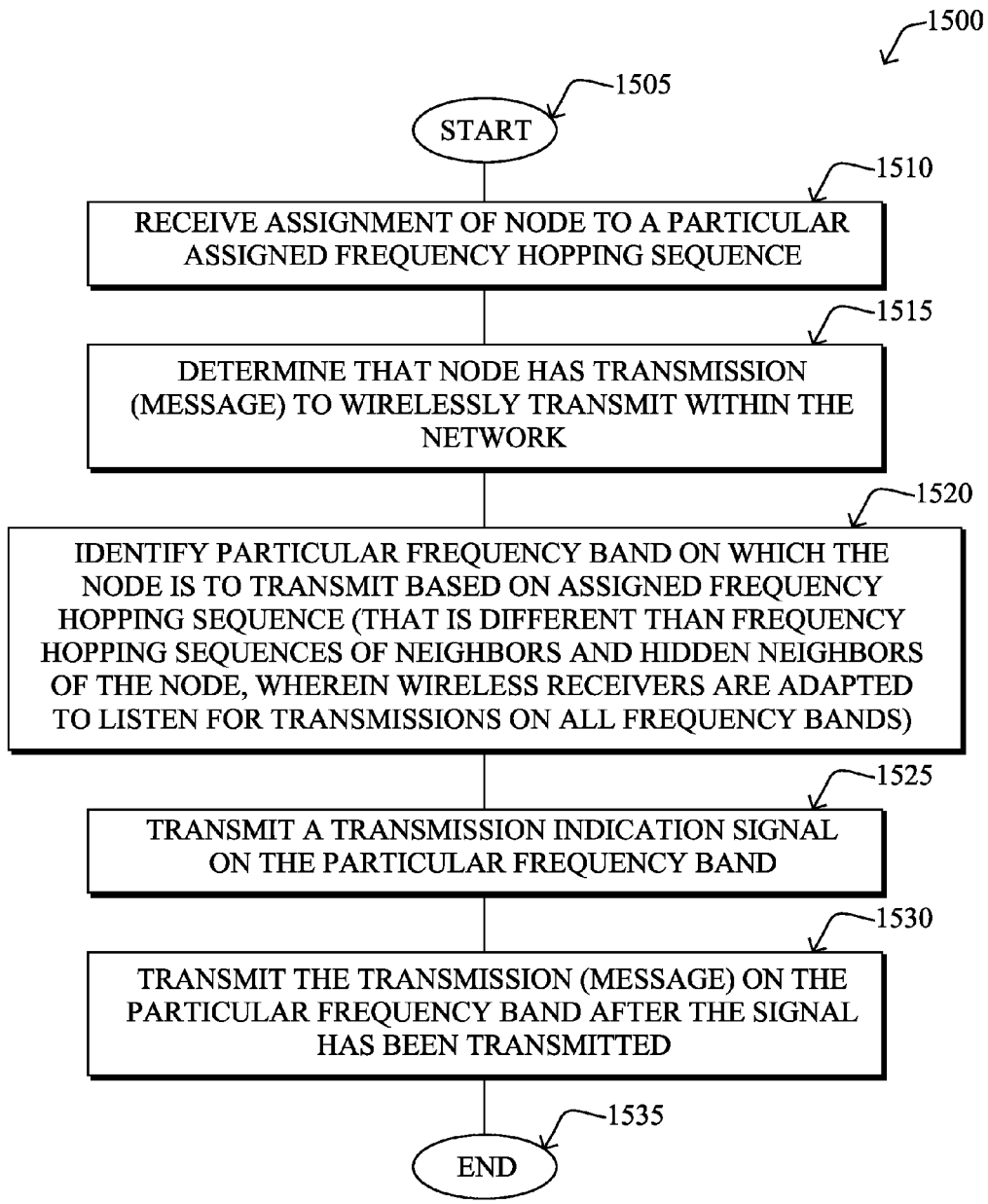
FIG. 15 illustrates an example simplified procedure for transmitting based on dynamically assigned frequency hopping sequences in a communication network.

Further, FIG. 15 illustrates an example simplified procedure for transmitting a transmission based on dynamically assigned frequency hopping sequences in a communication network (e.g., with reference to FIG. 11 above). The procedure 1500 starts at step 1505, and continues to step 1510, where a transmitting node 200 receives an assignment of a particular assigned frequency hopping sequence. Subsequently, upon determining in step 1515 that the node has a message 300 to wirelessly transmit within the network 100, the node may, in step 1520 identify the particular frequency band on which the node is assigned to transmit based on its assigned frequency hopping sequence. Note that this identification may be to recall a single frequency, select a given frequency from a band of frequencies, or determine which current frequency in a frequency hopping scheme is currently to be utilized.

In step 1525, the transmitting node initiates the transmission by first transmitting a transmission indication signal 1140 on the particular frequency band according to the frequency hopping sequence. Once this has been transmitted, and, e.g., after a certain delay 1145, the transmitting node may commence transmitting the message (e.g., packet) 300 in step 1530 on the particular frequency band. The procedure 1500 ends in step 1535 once the transmission is complete.

Figure 16:
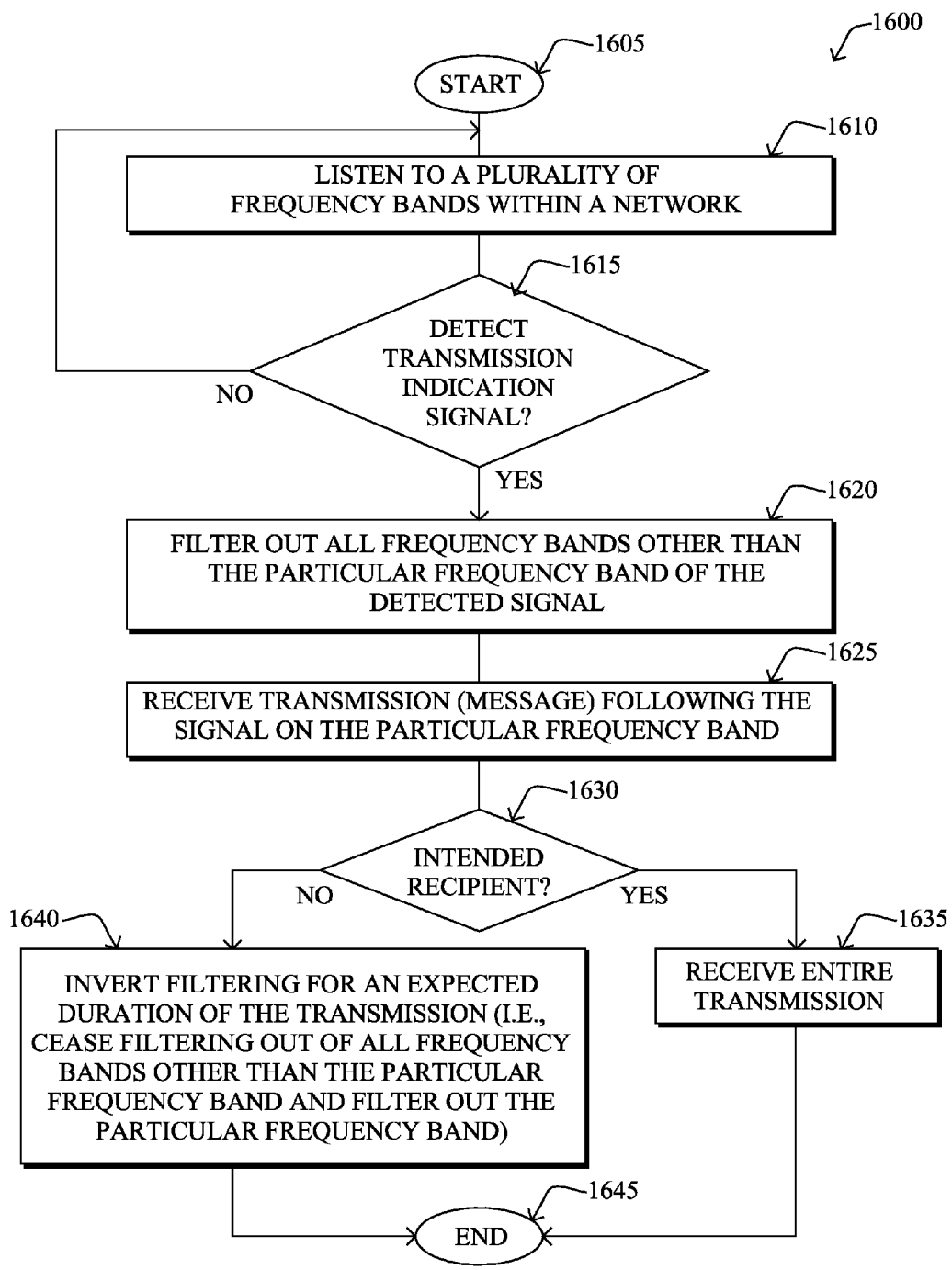
FIG. 16 illustrates an example simplified procedure for receiving transmissions based on dynamically assigned frequency hopping sequences in a communication network.

Lastly, FIG. 16 illustrates an example simplified procedure for receiving transmissions in a communication network based on dynamically assigned frequency hopping sequences (e.g., with reference to FIGS. 12A-C above). The procedure 1600 starts at step 1605, and continues to step 1610, where a receiving node listens to a plurality of frequency bands within a network until receiving a transmission indication signal 1140 in step 1615 (e.g., as shown in FIG. 12A). Upon receipt of a transmission indication signal, the receiving node filters out all frequency bands other than the particular frequency band of the detected signal in step 1620 (e.g., as shown in FIG. 12B), and may then begin receiving the transmission 1150 following the signal on the particular frequency band in step 1625.

In certain embodiments, the receiving node may determine whether it is the intended recipient in step 1630, such as based on analyzing the header 310 of a packet 300 as it is received. If the receiving node is the intended recipient, then it may continue to receive the entire message in step 1635. However, in the event that the receiving node is not the intended recipient in step 1630, then in step 1640 it may invert the filtering for an expected duration of the transmission. That is, as described above, the receiving node may cease filtering out of all frequency bands other than the particular frequency band, and begin filtering out the particular frequency band (e.g., as in FIG. 12C). The procedure 1600 may then end in step 1645, e.g., once the transmission is completed, whether the intended recipient or not, and may thus return to steps 1605/1610 to listen for future signals.

The novel techniques described herein, therefore, dynamically assign frequency hopping sequences to nodes in a shared media network. In particular, by providing preferential treatment to nodes/links which carry the highest traffic (e.g., most child nodes, most traffic, highest priority traffic, etc.), total network collisions (as well as the resulting retransmits) over critical links is greatly reduced. Consequently, the efficiency of the network is greatly increased. Once the frequency hopping sequences have been assigned (notably in a minimally computational manner), the embodiments above also describe a novel technique to adaptively listen to a specific channel at any given time. As an example, in existing systems, it is not uncommon to have one hundred first order children use the same frequency hopping sequence which leads to numerous packet collisions in the most heavily used segments of the network. In accordance with the techniques herein, the most heavily traversed portions of the network use greater frequency diversity and therefore collisions are greatly reduced thus increasing the overall network efficiency.

While there have been shown and described illustrative embodiments that dynamically assign frequency hopping sequences to nodes in a shared media network, it is to be understood that various other adaptations and modifications may be made within the spirit and scope of the embodiments herein. For example, the embodiments have been shown and described herein with relation to wireless networks, such as LLNs. However, the embodiments in their broader sense are not as limited, and may, in fact, be used with other types of shared media networks and/or protocols, also where only certain nodes within the network communicate on the shared media. Also, while the description above often references packetized transmissions, the techniques may be equally is applicable to non-packetized transmissions. Further, while the techniques described above generally reference wireless communication, other shared media (e.g., PLC) may be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a node in a network, that the node has a transmission to transmit within the network;
   identifying and assigning, by the node, a particular frequency band on which the node is to transmit, wherein the particular frequency band is assigned to the node based on a topology of the network such that each node of a particular certain set of nodes is assigned a particular frequency hopping sequence of a plurality of frequency hopping sequences that is different than frequency hopping sequences of neighbors and hidden neighbors of each node of the particular certain set of the nodes, wherein the topology of the network is determined by another node in the network;
   transmitting, by the node, a transmission indication signal on the particular frequency band; and
   transmitting, by the node, the transmission on the particular frequency band after the transmission indication signal has been transmitted.

2. The method as in claim 1, further comprising:
   receiving assignment of the frequency hopping sequence from a management node of the network.

3. The method of claim 1, wherein receivers are adapted to listen for transmissions on all frequency bands.

4. An apparatus, comprising:
   a processor; and
   one or more shared media network interfaces to communicate in a network, the one or more network interfaces configured to:
      determine that there is a message to transmit from the apparatus;
      identify and assign a particular frequency band on which the apparatus is to transmit, wherein the particular frequency band is assigned to the node based on a topology of the network such that each node of a particular certain set of nodes is assigned a particular frequency hopping sequence of a plurality of frequency hopping sequences that is different than frequency hopping sequences of neighbors and hidden neighbors of each node of the particular certain set of the nodes, wherein the topology of the network is determined by another node in the network;
      transmit a transmission indication signal on the particular frequency band; and
      transmit the transmission on the particular frequency band after the transmission indication signal has been transmitted.

5. The apparatus as in claim 4, wherein the assignment of the frequency hopping sequence is received from a management node of the network.

6. The apparatus of claim 4, wherein receivers are adapted to listen for transmissions on all frequency bands.

7. A tangible, non-transitory, computer-readable media having software encoded thereon, the software when executed by a processor operable to:
   determine that there is a message to transmit from a node;
   identify and assign a particular frequency band on which the apparatus is to transmit, wherein the particular frequency band is assigned to the node based on a topology of the network such that each node of a particular certain set of nodes is assigned a particular frequency hopping sequence of a plurality of frequency hopping sequences that is different than frequency hopping sequences of neighbors and hidden neighbors of each node of the particular certain set of the nodes, wherein the topology of the network is determined by another node in the network;
   transmit a transmission indication signal on the particular frequency band; and
   transmit the transmission on the particular frequency band after the transmission indication signal has been transmitted.

8. The tangible, non-transitory, computer-readable media as in claim 7, wherein the software, when executed by a processor, is further operable to:
   receive assignment of the frequency hopping sequence from a management node of the network.

* * * * *